US012754404B2

(12) United States Patent
Iriyama et al.

(10) Patent No.: US 12,754,404 B2
(45) Date of Patent: Oct. 6, 2026

(54) ZOOM LENS AND IMAGING APPARATUS INCLUDING THE SAME

(71) Applicant: CANON KABUSHIKI KAISHA, Tokyo (JP)

(72) Inventors: Yutaka Iriyama, Saitama (JP); Naotoshi Ogawa, Tochigi (JP); Yusuke Kurosu, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 18/760,713

(22) Filed: Jul. 1, 2024

(65) Prior Publication Data

US 2025/0013024 A1 Jan. 9, 2025

(30) Foreign Application Priority Data

Jul. 5, 2023 (JP) ................................ 2023-110812

(51) Int. Cl.
*G02B 15/14* (2006.01)
*G02B 9/64* (2006.01)
*G02B 13/00* (2006.01)

(52) U.S. Cl.
CPC ....... *G02B 15/145125* (2019.08); *G02B 9/64* (2013.01); *G02B 13/0045* (2013.01); *G02B 13/009* (2013.01)

(58) Field of Classification Search
CPC ..................................................... G02B 15/14
See application file for complete search history.

(56) References Cited

U.S. PATENT DOCUMENTS

| | | | | |
|---|---|---|---|---|
| 10,359,604 | B2 * | 7/2019 | Hori | G02B 15/173 |
| 11,327,280 | B2 * | 5/2022 | Ota | G02B 15/145117 |
| 2022/0003977 | A1 * | 1/2022 | Shimada | G02B 15/145129 |

FOREIGN PATENT DOCUMENTS

| | | | |
|---|---|---|---|
| JP | S52120850 | A | 10/1977 |
| JP | S62247317 | A | 10/1987 |
| JP | 2013221999 | A | 10/2013 |
| JP | 2014232273 | A | 12/2014 |
| JP | 2017181577 | A | 10/2017 |
| JP | 2019078849 | A | 5/2019 |
| JP | 2020012870 | A | 1/2020 |
| JP | 2020012908 | A | 1/2020 |
| JP | 2020085935 | A | 6/2020 |
| JP | 2021067804 | A | 4/2021 |
| JP | 2022001935 | A | 1/2022 |

* cited by examiner

*Primary Examiner* — Edmond C Lau
(74) *Attorney, Agent, or Firm* — Canon U.S.A., Inc. IP Division

(57) ABSTRACT

A zoom lens includes a first lens group arranged closest to an object side, configured not to move for zooming, and having a positive refractive power, a lens group GR arranged closest to an image side, configured not to move for zooming, and having a positive refractive power, and a lens group GP arranged adjacent to the object side of the lens group GR, configured to move for zooming, and having a positive refractive power, wherein the lens group GR consists of a subgroup GRN having a negative refractive power and a subgroup GRP having a positive refractive power, which are arranged with a longest air gap on an optical axis in the lens group GR, and configuration of the subgroup GRN and a lateral magnification of the lens group GR are appropriately set.

14 Claims, 15 Drawing Sheets

ZOOM LENS AND IMAGING APPARATUS INCLUDING THE SAME

BACKGROUND

Technical Field

The aspect of the embodiments relates to a zoom lens suitable for use in imaging apparatuses, such as digital video cameras, digital still cameras, broadcast cameras, and surveillance cameras.

Description of the Related Art

A zoom lens for use in imaging apparatuses, such as television cameras, movie cameras, broadcast cameras, and video cameras, is required to be small in size and weight and have a wide angle of view, a high zoom ratio, and high optical performance. Further, with an increase in use of image sensors compatible with high resolutions, such as 4K and 8K, a zoom lens is also required to have high resolving power from the center to the periphery of a formed optical image and low chromatic aberration.

A positive lead type zoom lens in which a first lens group having a positive refractive power and a second lens group configured to move for zooming and having a negative refractive power are arranged in this order from an object side to an image side is known as a zoom lens with a wide angle of view and a high zoom ratio. Japanese Patent Application Laid-Open No. 2020-12908 discusses a zoom lens consisting of a first lens group configured not to move for zooming and having a positive refractive power, a plurality of lens groups configured to move for zooming, and a lens group configured not to move for zooming and having a positive refractive power, arranged in this order from an object side to an image side.

The above-described positive lead type zoom lens may be disadvantageous for achieving a wider angle of view and a higher zoom ratio in terms of optical performance and size reduction.

SUMMARY

According to an aspect of the embodiments, a zoom lens includes a first lens group arranged closest to an object side, configured not to move for zooming, and having a positive refractive power, a lens group GR arranged closest to an image side, configured not to move for zooming, and having a positive refractive power, and a lens group GP arranged adjacent to the object side of the lens group GR, configured to move for zooming, an interval between the adjacent lens groups being changed in zooming, and having a positive refractive power, wherein the lens group GR consists of a subgroup GRN having a negative refractive power and a subgroup GRP having a positive refractive power, which are arranged with a longest air gap on an optical axis in the lens group GR, and wherein the following conditional inequalities are satisfied:

$$0.0 < vdGRNn - vdGRNp < 50.0; \text{ and}$$

$$0.1 < \beta GR < 0.7,$$

where vdGRNn is an average value of an Abbe number with reference to a d-line of a material of a negative lens in the subgroup GRN, vdGRNp is an average value of an Abbe number with reference to a d-line of a material of a positive lens in the subgroup GRN, and PGR is a lateral magnification of the lens group GR.

Further features of the disclosure will become apparent from the following description of exemplary embodiments with reference to the attached drawings.

DESCRIPTION OF THE EMBODIMENTS

Figure 1:
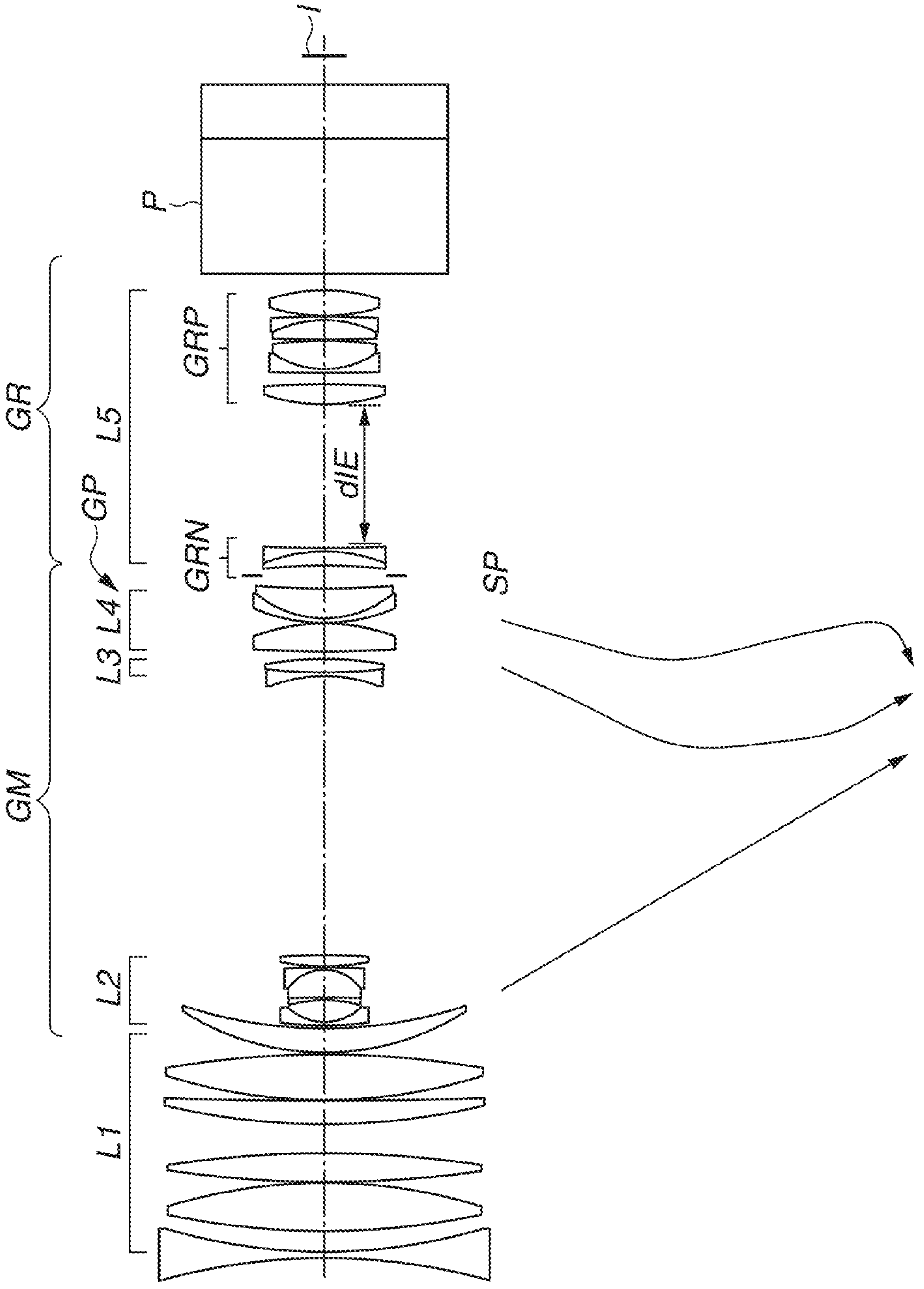
FIG. 1 is a lens cross-sectional view of a zoom lens according to a first exemplary embodiment at a wide-angle end.
Figure 2A:
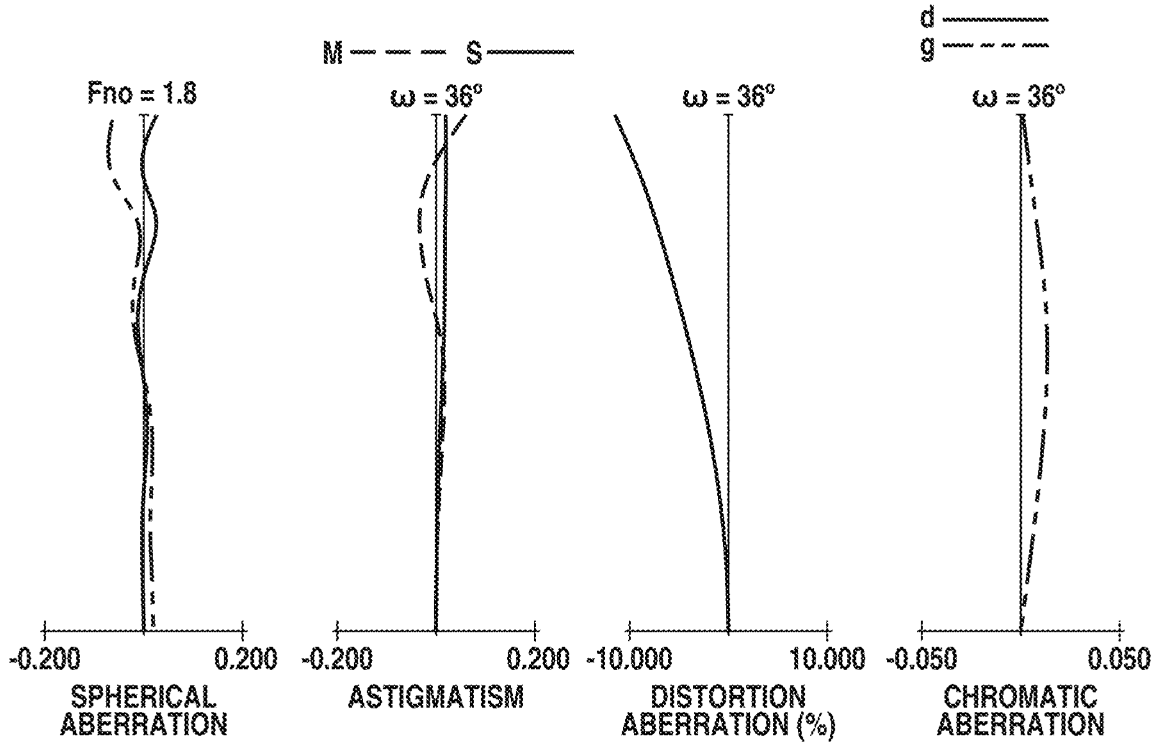
FIGS. 2A and 2B are aberration diagrams of the zoom lens according to the first exemplary embodiment at the wide-angle and telephoto ends.
Figure 2B:
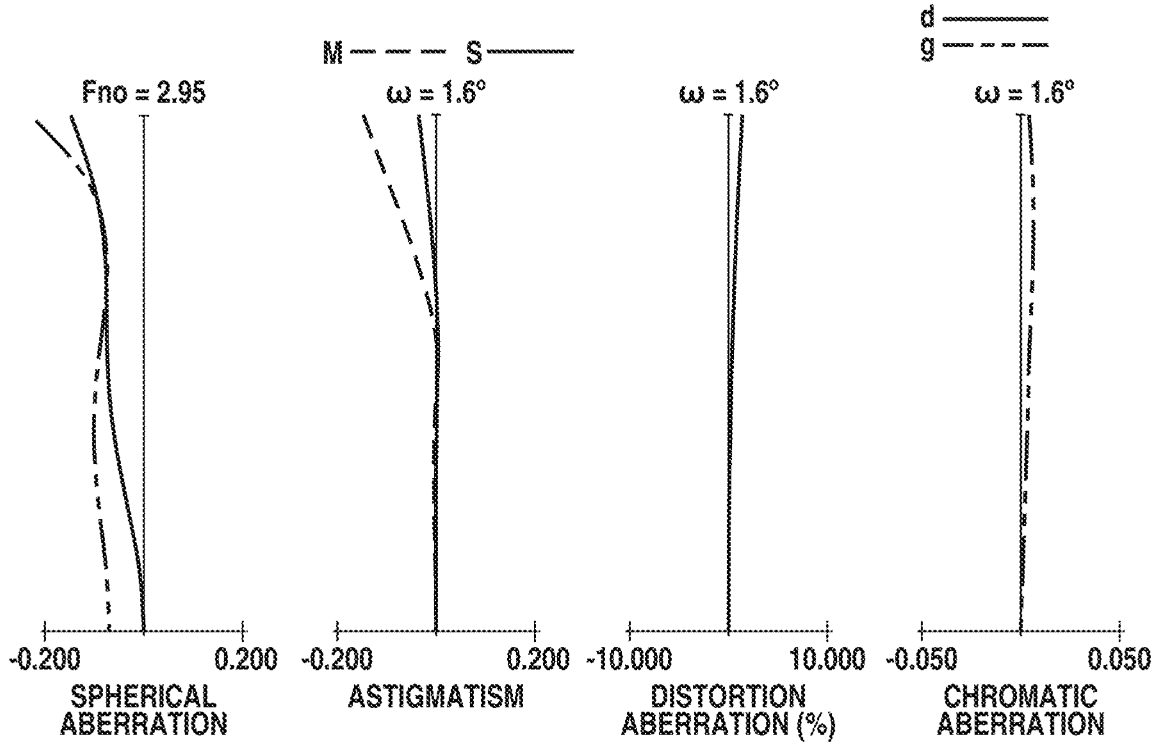
Figure 3:
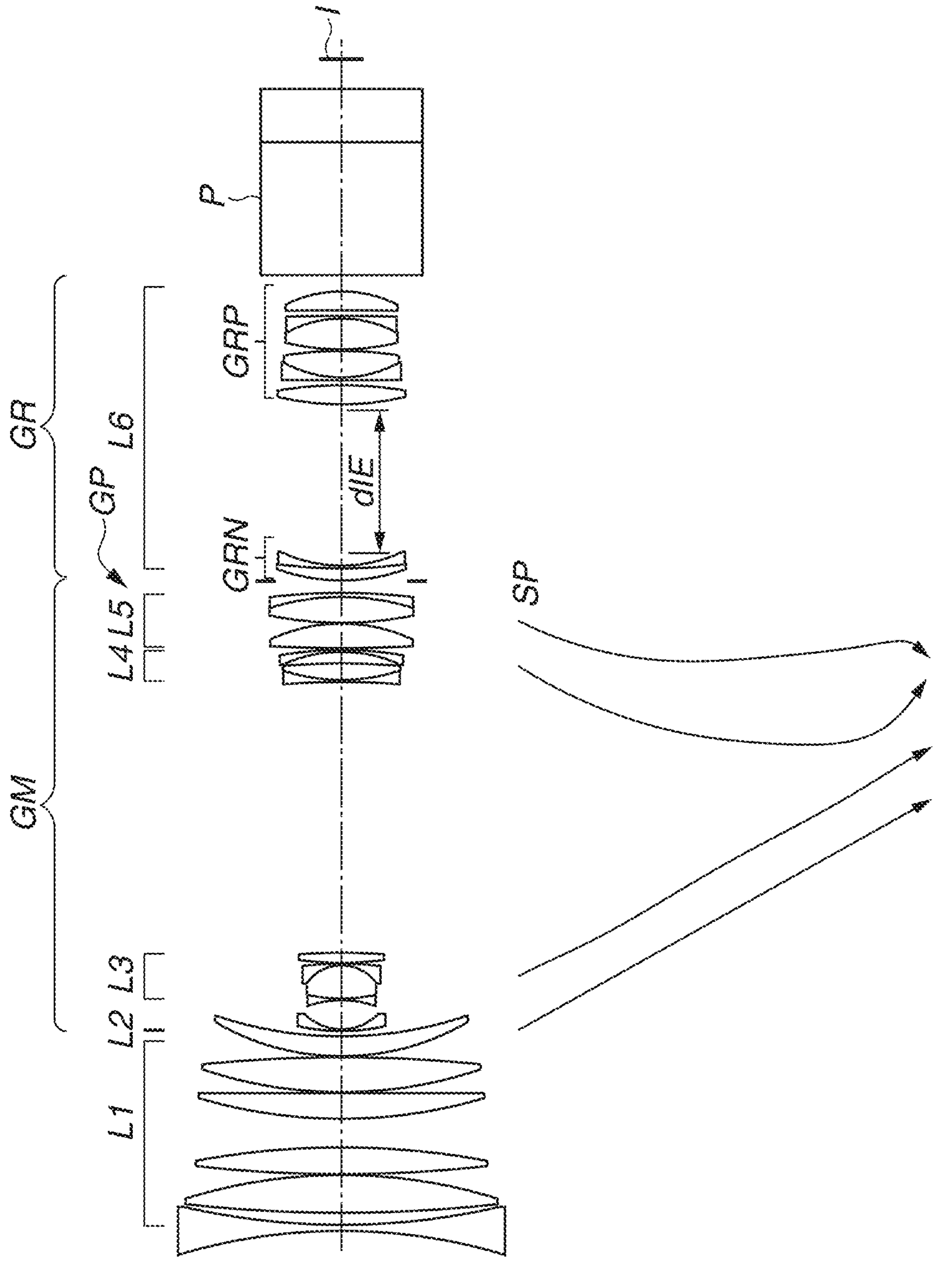
FIG. 3 is a lens cross-sectional view of a zoom lens according to a second exemplary embodiment at a wide-angle end.
Figure 4A:
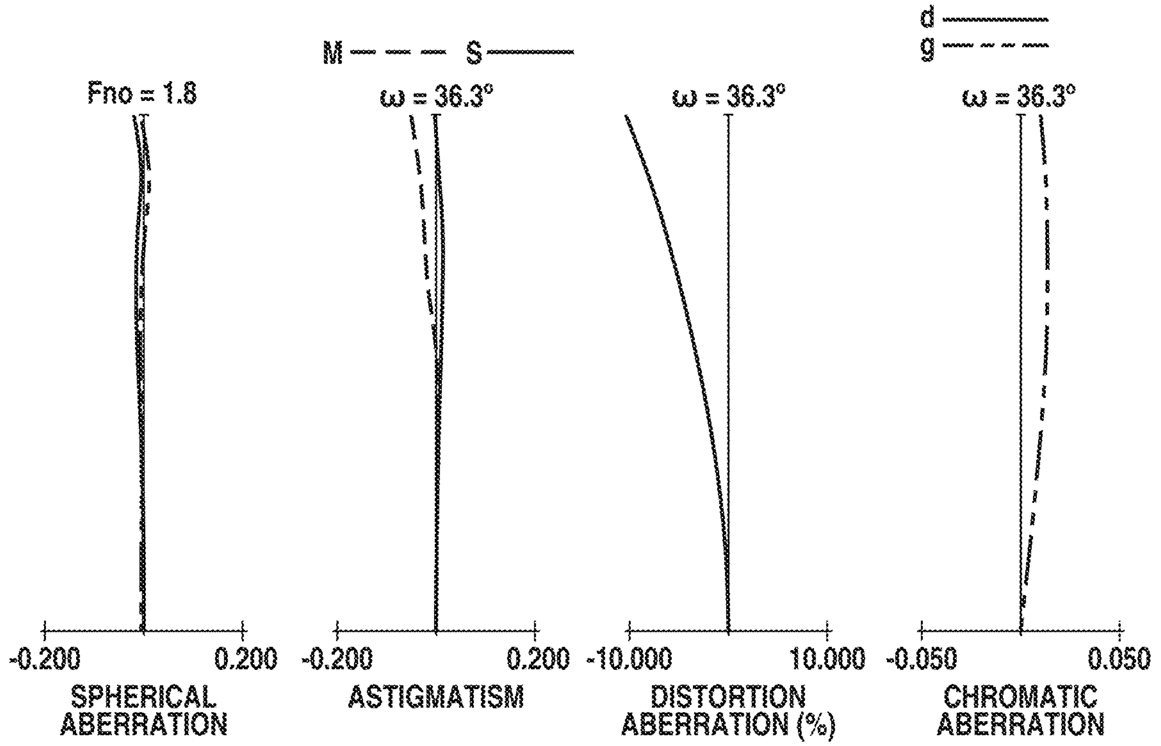
FIGS. 4A and 4B are aberration diagrams of the zoom lens according to the second exemplary embodiment at the wide-angle and telephoto ends.
Figure 4B:
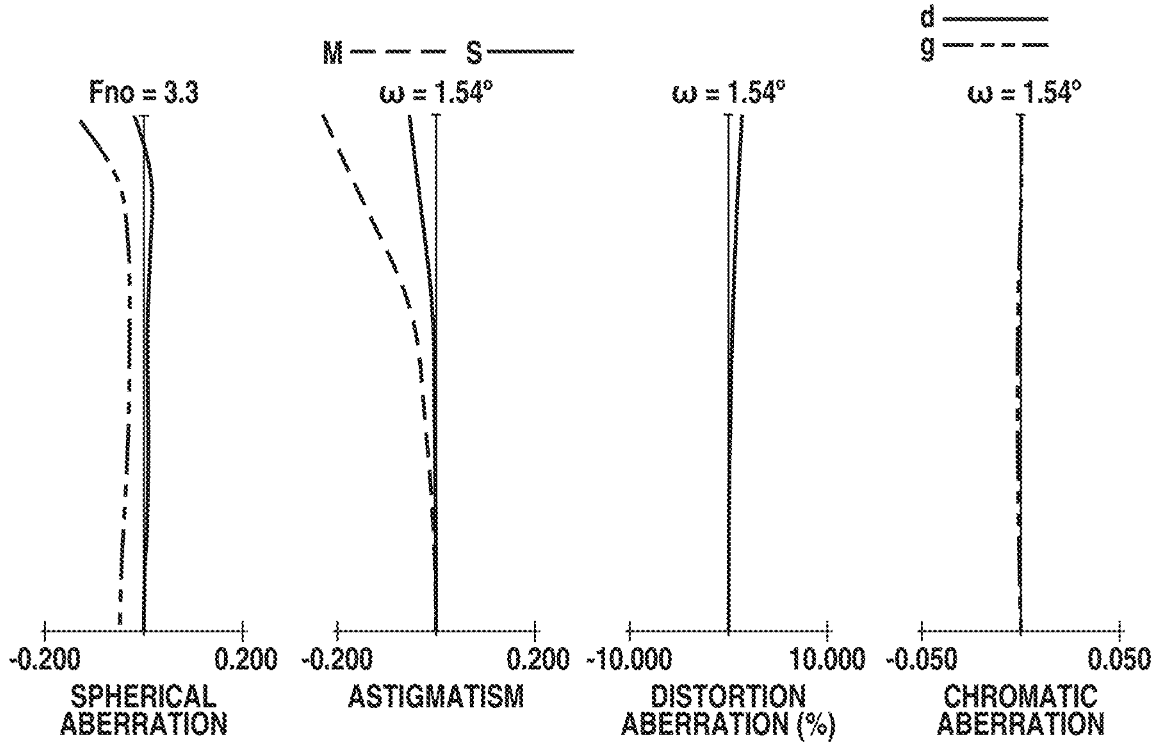
Figure 5:
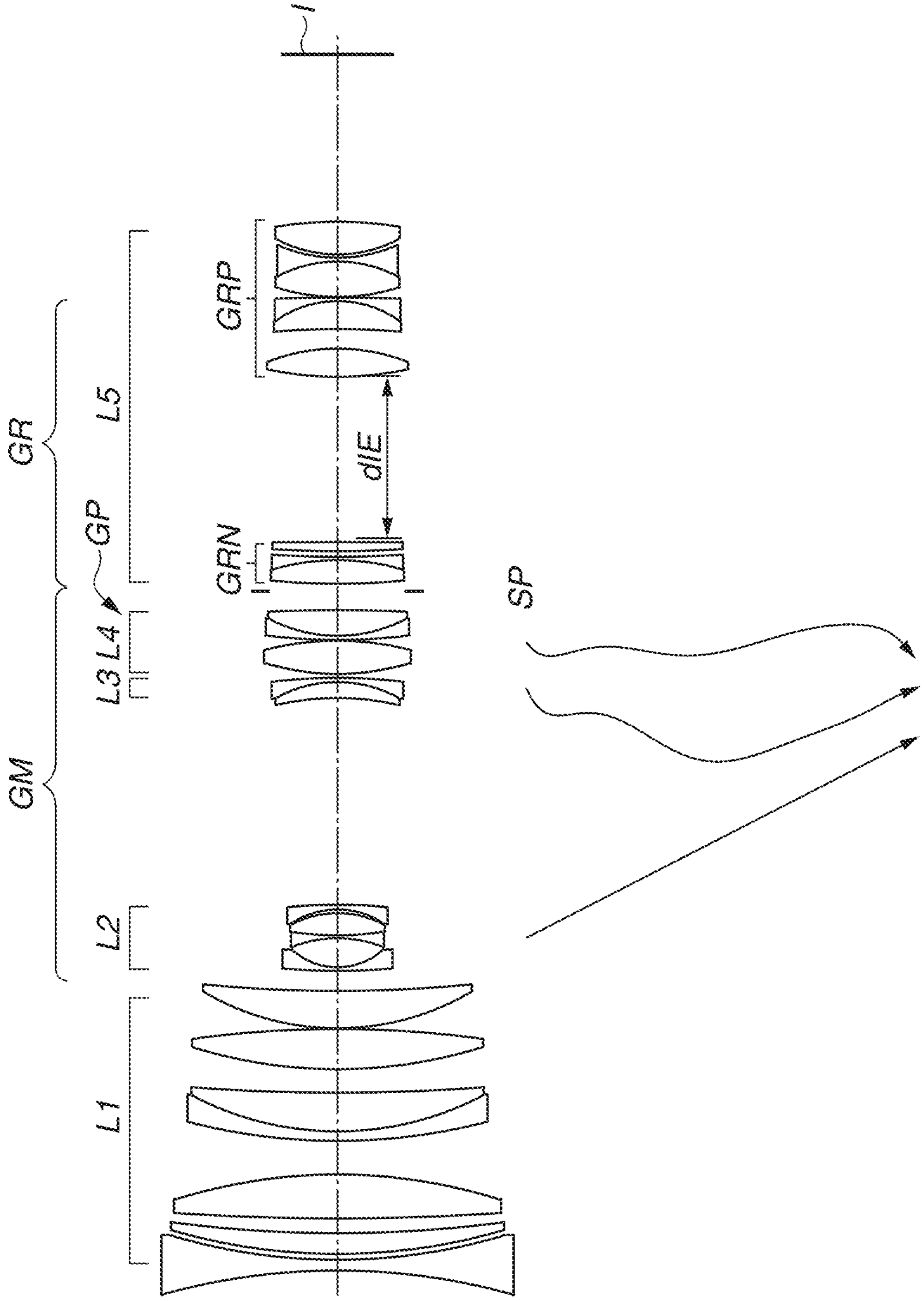
FIG. 5 is a lens cross-sectional view of a zoom lens according to a third exemplary embodiment at a wide-angle end.
Figure 6A:
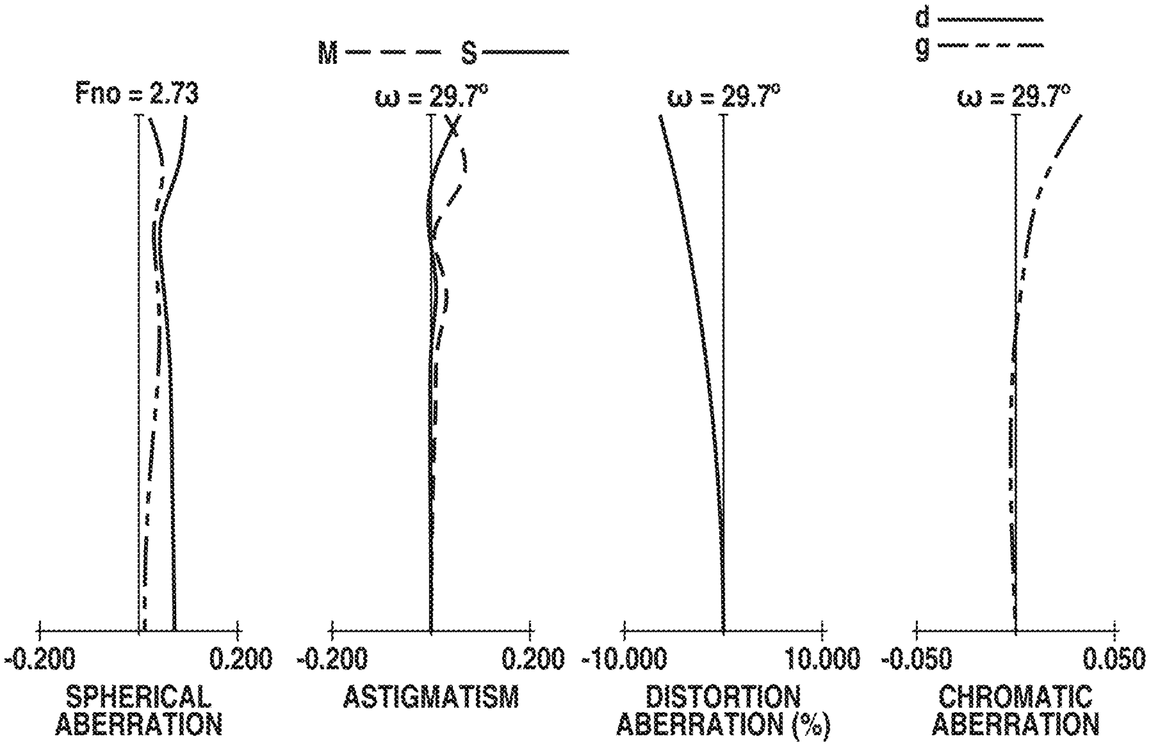
FIGS. 6A and 6B are aberration diagrams of the zoom lens according to the third exemplary embodiment at the wide-angle and telephoto ends.
Figure 6B:
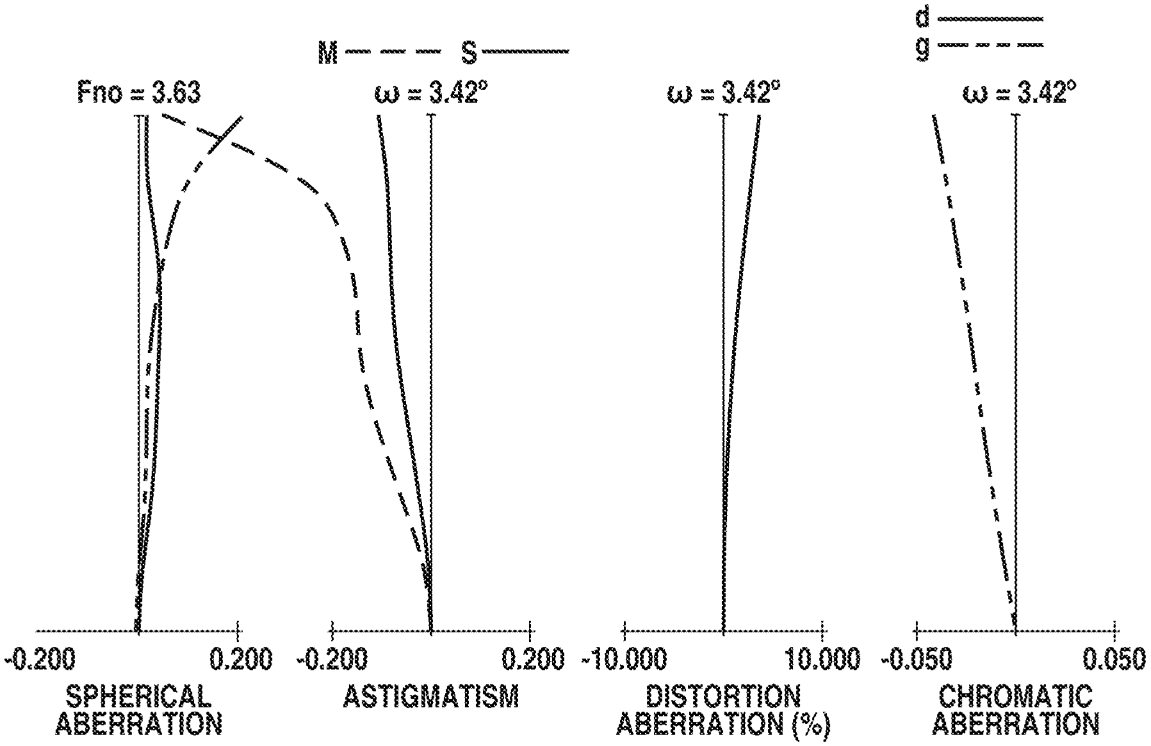
Figure 7:
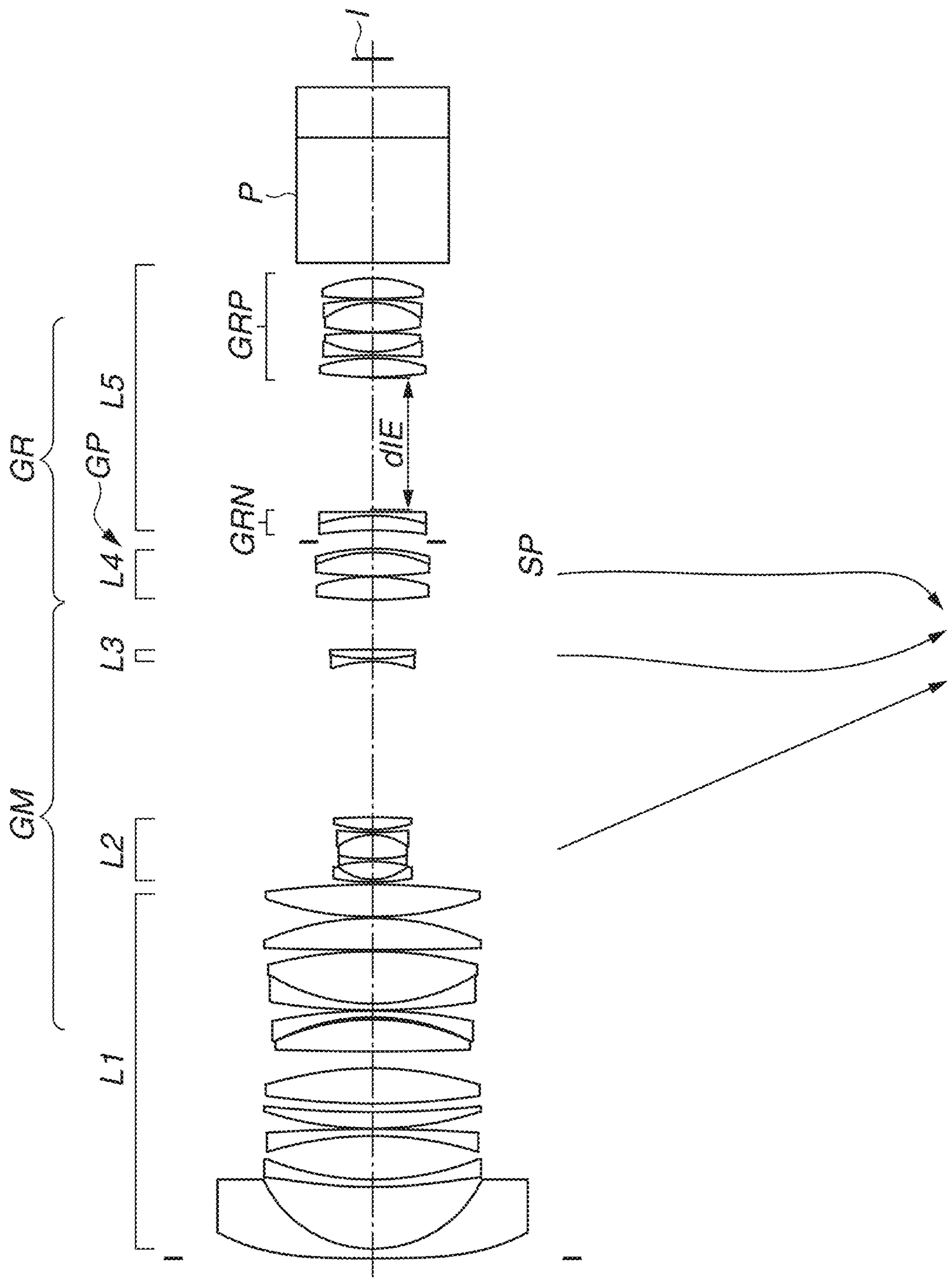
FIG. 7 is a lens cross-sectional view of a zoom lens according to a fourth exemplary embodiment at a wide-angle end.
Figure 8A:
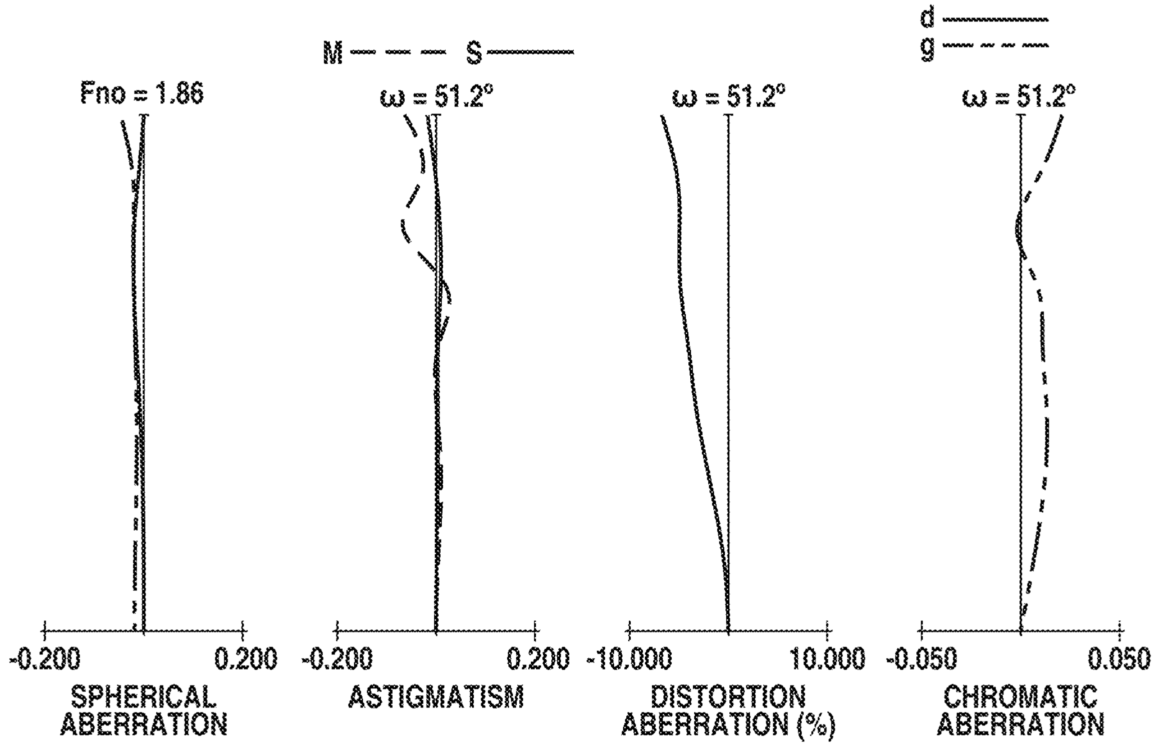
FIGS. 8A and 8B are aberration diagrams of the zoom lens according to the fourth exemplary embodiment at the wide-angle and telephoto ends.
Figure 8B:
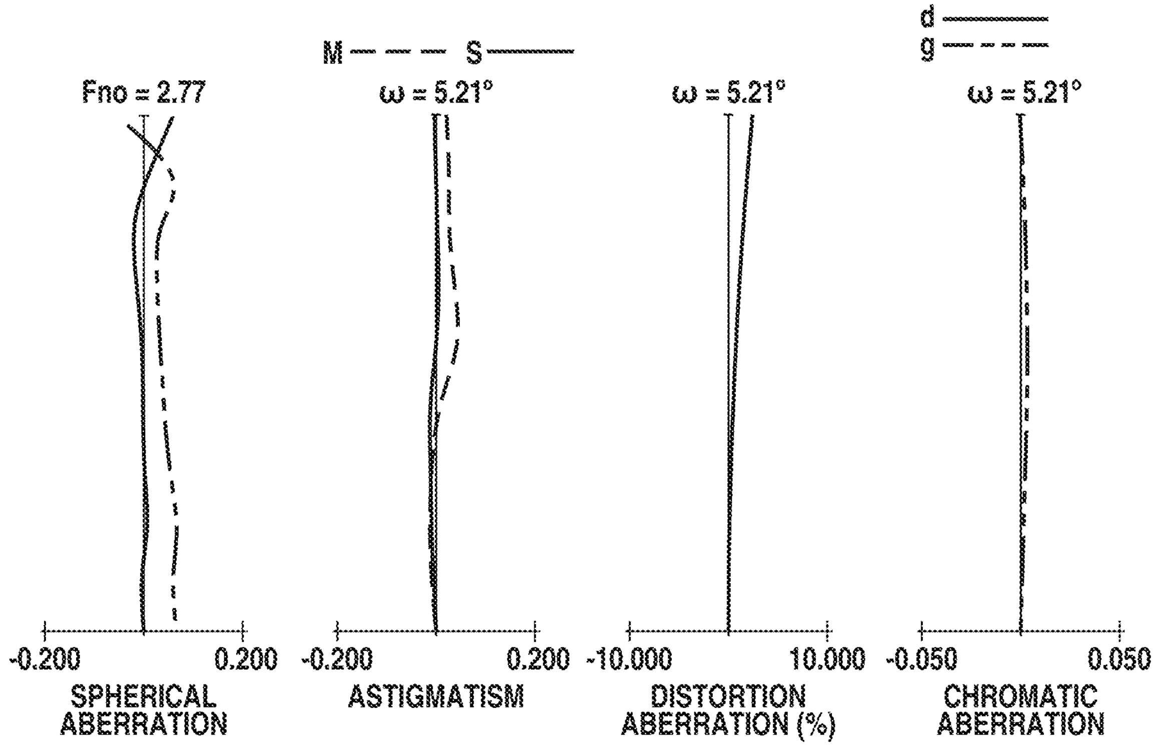
Figure 9:
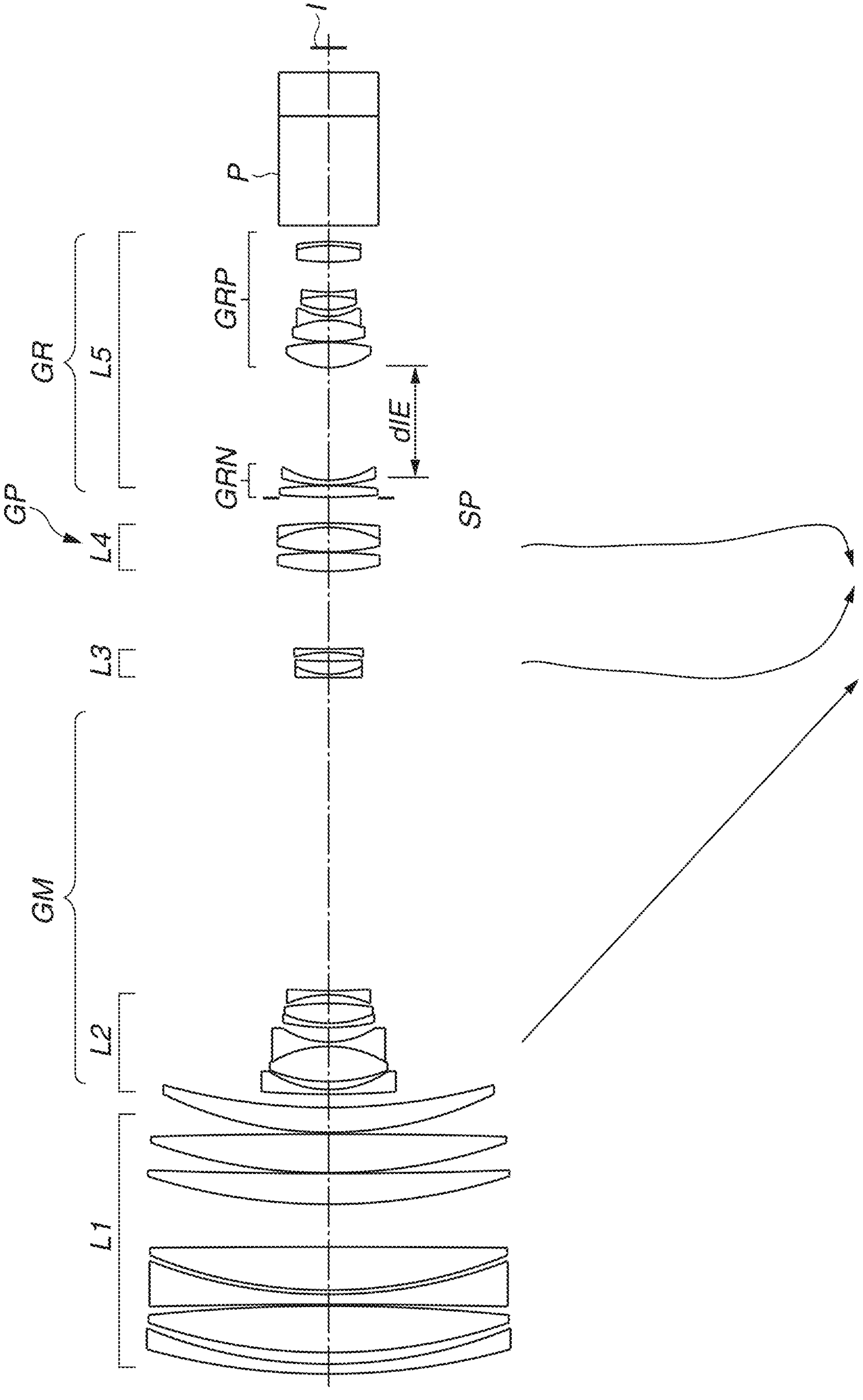
FIG. 9 is a lens cross-sectional view of a zoom lens according to a fifth exemplary embodiment at a wide-angle end.
Figure 10A:
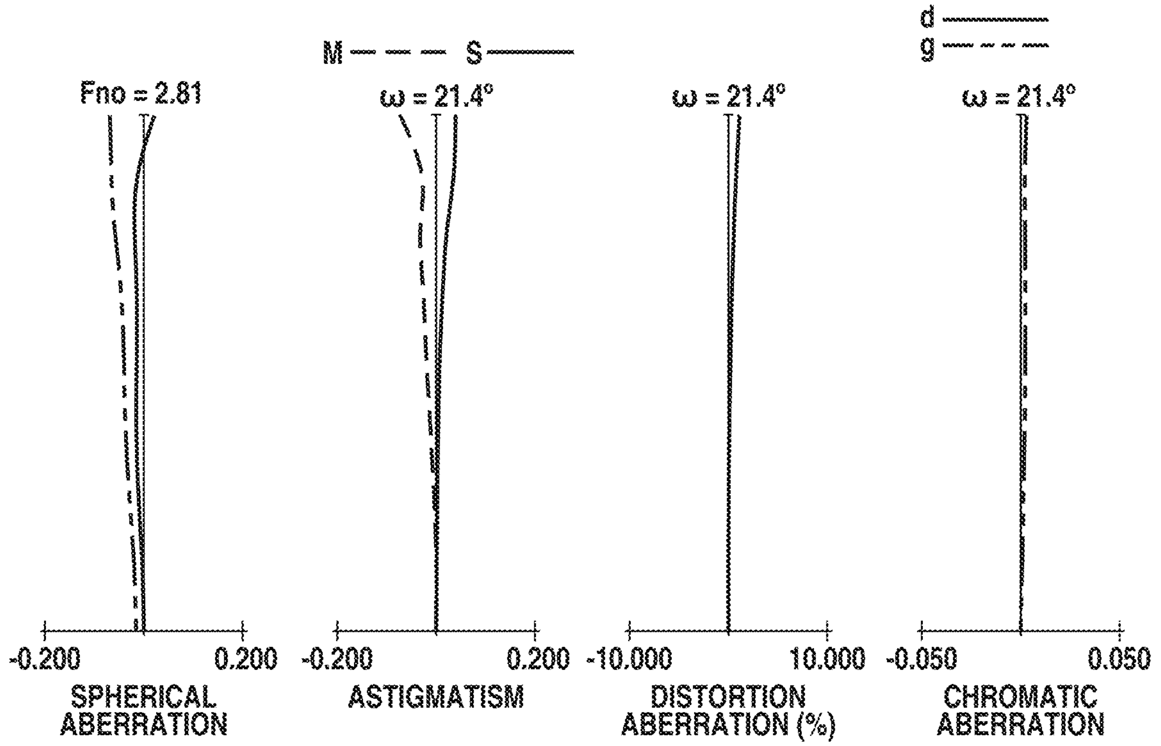
FIGS. 10A and 10B are aberration diagrams of the zoom lens according to the fifth exemplary embodiment at the wide-angle and telephoto ends.
Figure 10B:
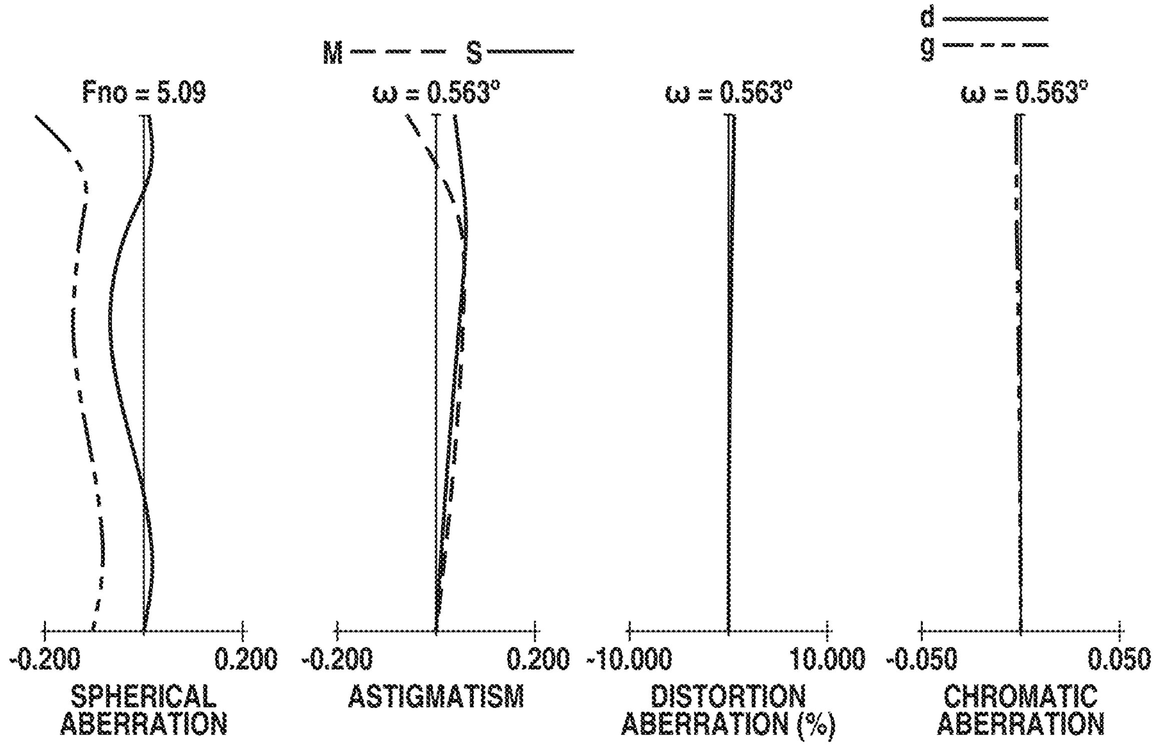
Figure 11:
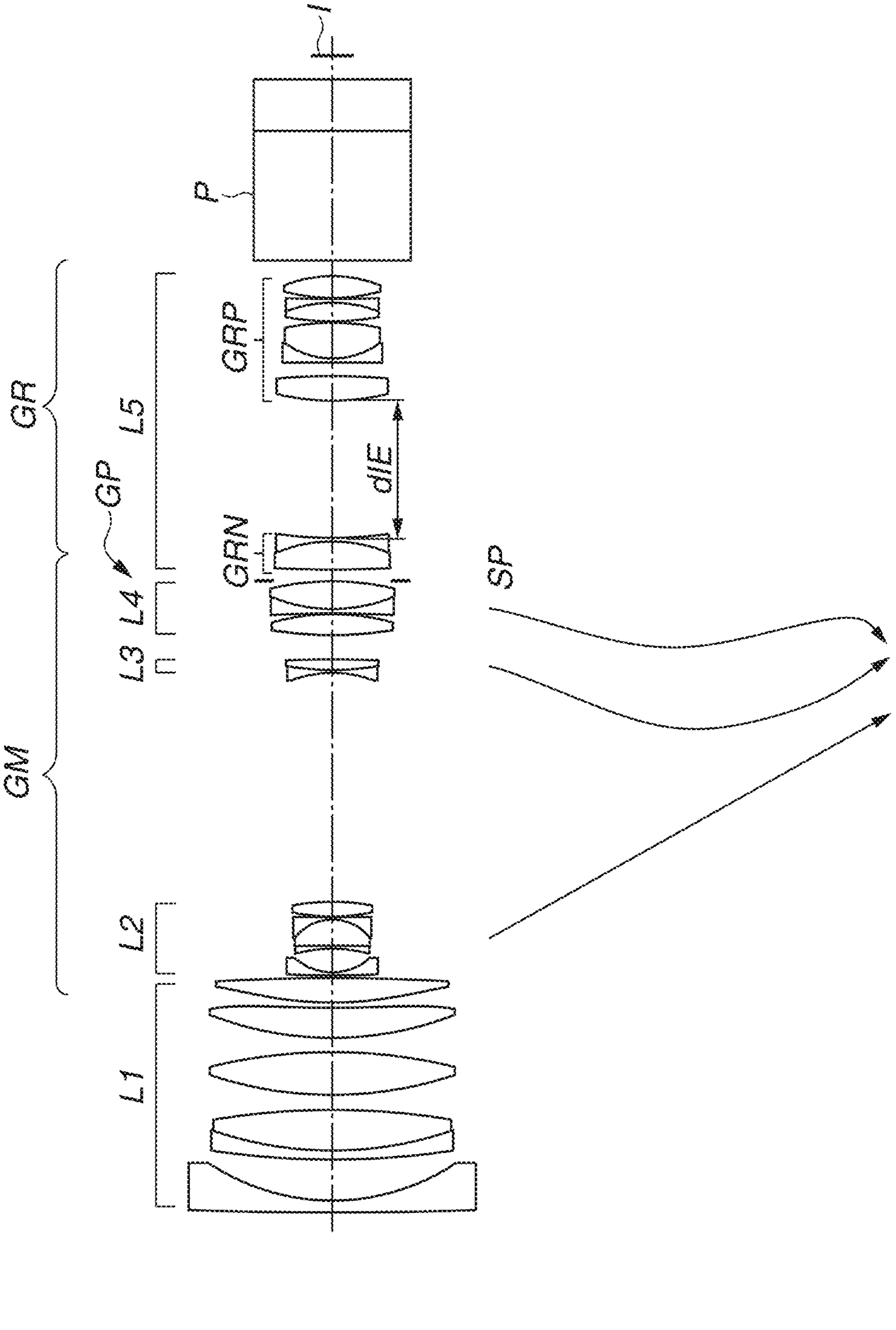
FIG. 11 is a lens cross-sectional view of a zoom lens according to a sixth exemplary embodiment at a wide-angle end.
Figure 12A:
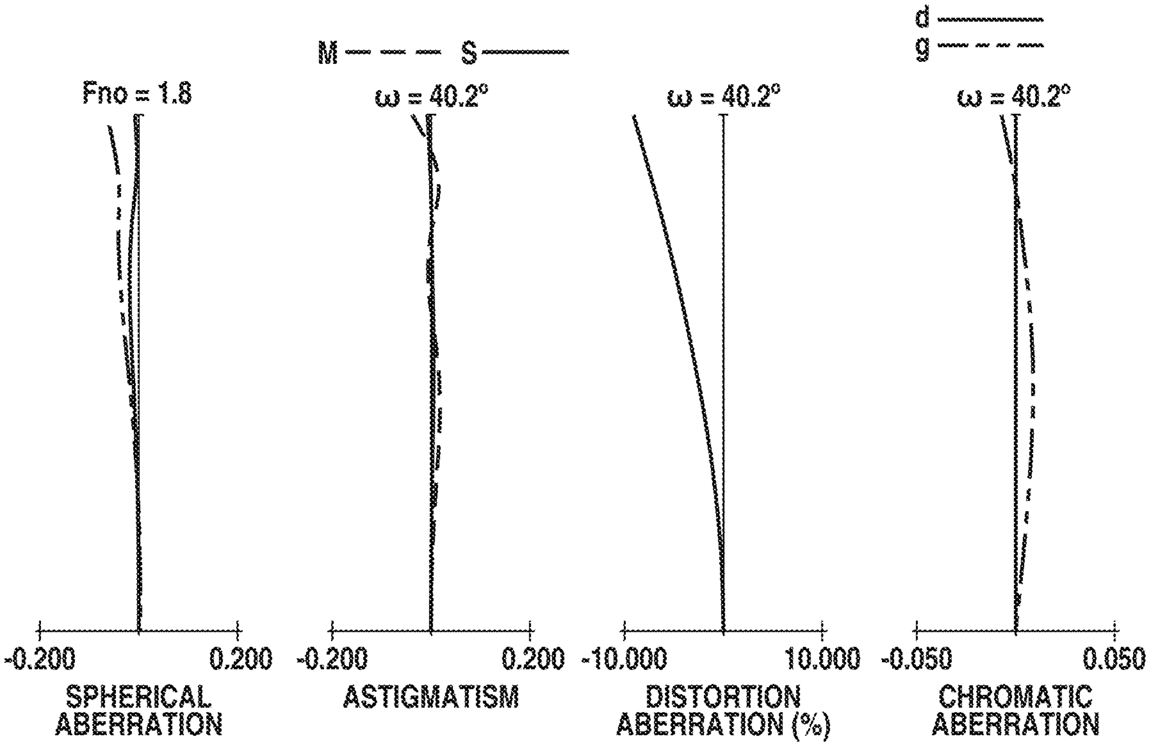
FIGS. 12A and 12B are aberration diagrams of the zoom lens according to the sixth exemplary embodiment at the wide-angle and telephoto ends.
Figure 12B:
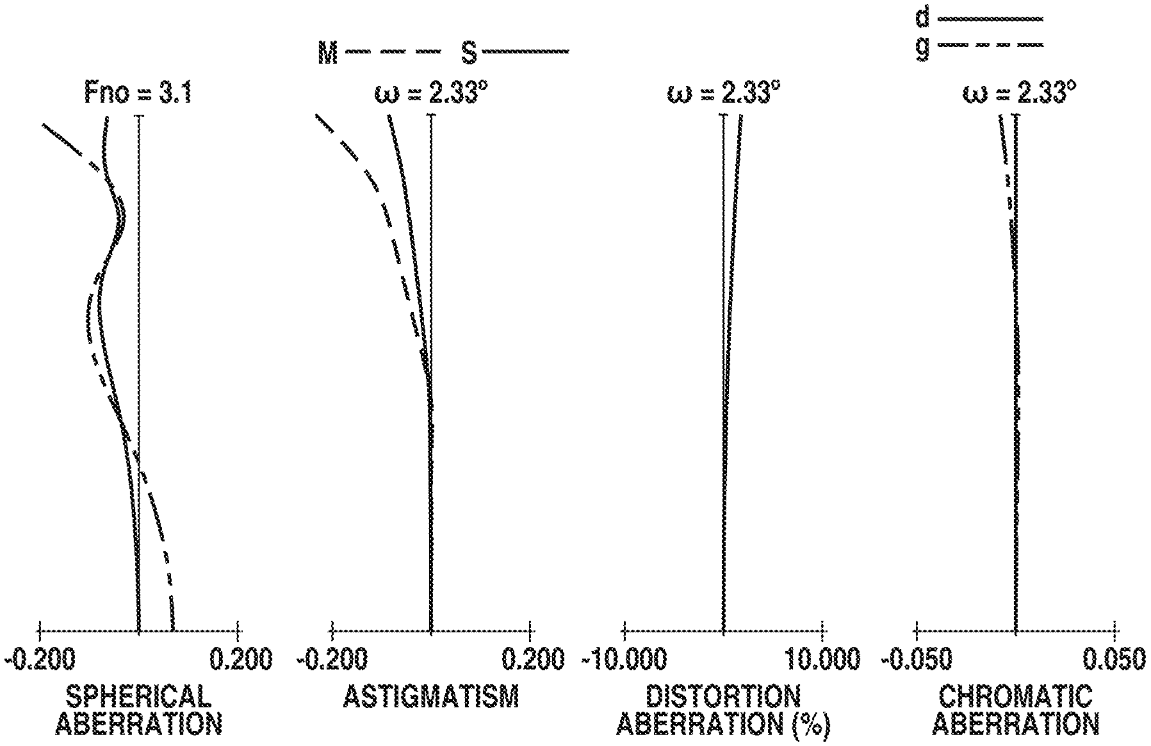
Figure 13:
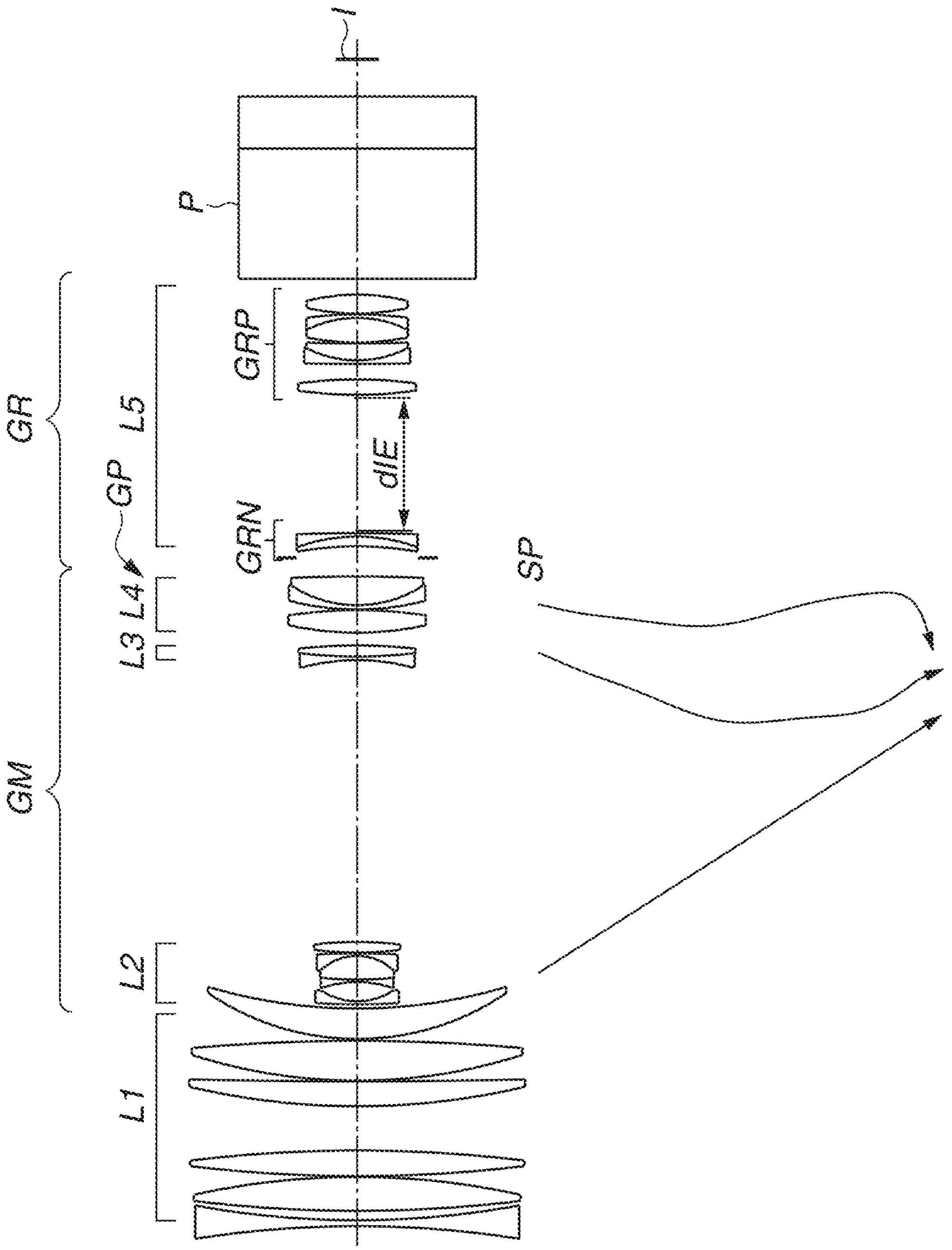
FIG. 13 is a lens cross-sectional view of a zoom lens according to a seventh exemplary embodiment at a wide-angle end.
Figure 14A:
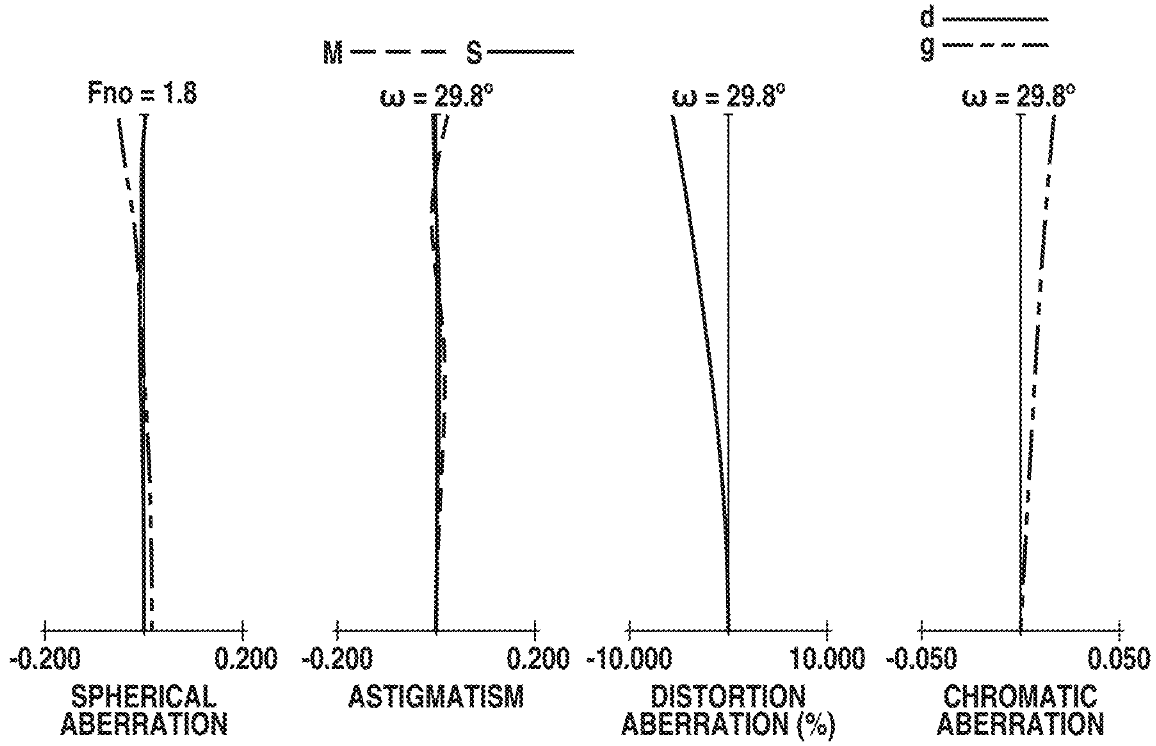
FIGS. 14A and 14B are aberration diagrams of the zoom lens according to the seventh exemplary embodiment at the wide-angle and telephoto ends.
Figure 14B:
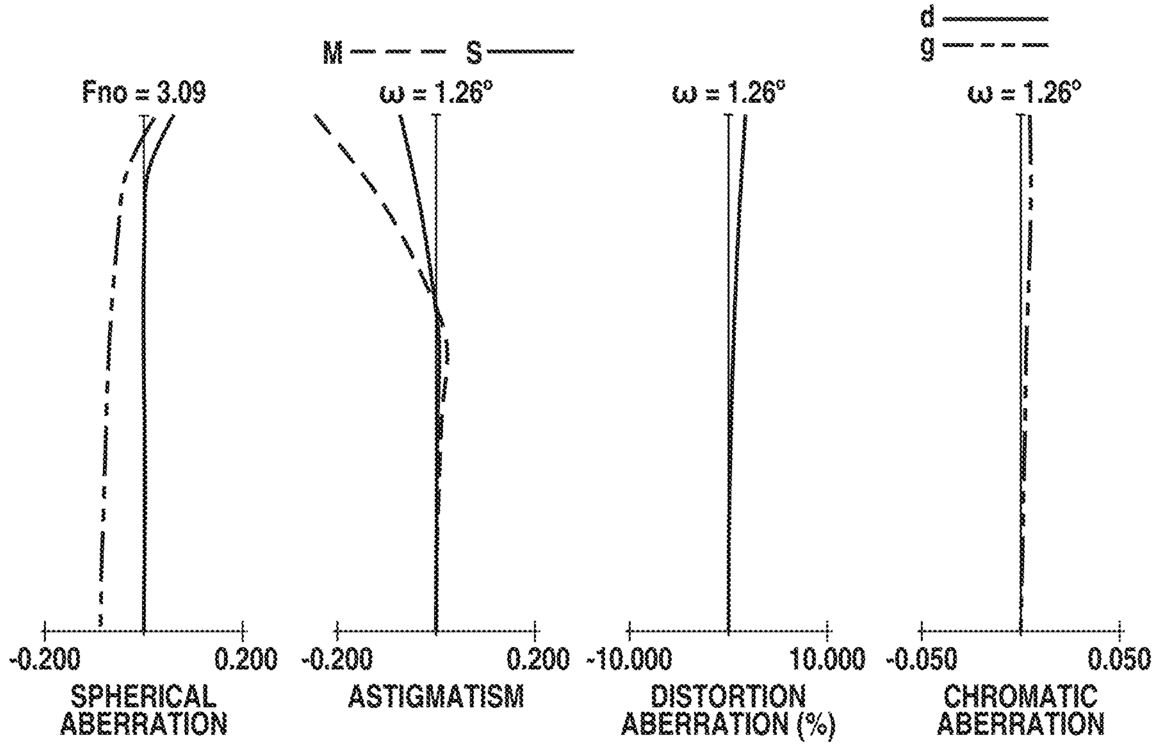

Zoom lenses and imaging apparatuses including the same according to exemplary embodiments of the disclosure will be described below with reference to the attached drawings.

FIGS. 1, 3, 5, 7, 9, 11, and 13 are cross-sectional views of zoom lenses at wide-angle ends and at infinity focus according to first to seventh exemplary embodiments. The zoom lenses according to the exemplary embodiments are zoom lenses for use in imaging apparatuses, such as digital video cameras, digital still cameras, broadcast cameras, silver halide film cameras, surveillance cameras, and vehicle-mounted cameras.

In each lens cross-sectional view, the left side is an object side, and the right side is an image side. The zoom lenses according to the exemplary embodiments may be used as a projection lens of a projector. In this case, the left side is a screen side, and the right side is a projected image side.

The zoom lenses according to the exemplary embodiments each include a first lens group L1 having a positive refractive power and configured not to move for zooming, a middle group GM including two or more lens groups configured to move for zooming, and a lens group GR having a positive refractive power and configured not to move for zooming, which are arranged in this order from the object side to the image side. The lens group GR is a lens group arranged closest to the image side. The middle group GM includes a lens group GP configured to move for zooming, and the lens group GP is arranged adjacent to the object side of the lens group GR. The term "lens group" herein refers to a group of one or more lenses configured to move as a unit in zooming from the wide-angle end to a telephoto end. Specifically, intervals between adjacent lens groups change in zooming. The lens group GR consists of a subgroup GRN having a negative refractive power and a subgroup GRP having a positive refractive power which are arranged with a longest air gap dIE between the subgroups GRN and GRP on an optical axis of the lens group GR.

Each arrow in the lens cross-sectional views indicates a trajectory of a lens group in zooming from the wide-angle end to the telephoto end. The wide-angle end and the telephoto end indicate zoom states at a maximum angle of view (shortest focal length) and a minimum angle of view (maximum focal length), respectively, in a case where the lens groups configured to move in zooming are at both ends of a movable range in terms of the mechanism or control on an optical axis.

In each lens cross-sectional view, an aperture stop SP is an aperture stop. An optical block P is an optical block corresponding to an optical filter, a faceplate, a low-pass filter, and an infrared cut filter. An image plane I is an image plane where an imaging surface of a solid-state image sensor (photoelectric conversion element), such as a charge-coupled device (CCD) sensor or a complementary metal oxide semiconductor (CMOS) sensor, of a zoom lens according to any of the exemplary embodiments is arranged in a case where the zoom lens is used in a surveillance camera or a broadcast camera. In a case where the zoom lens according to any of the exemplary embodiments is used as an imaging optical system of a silver halide film camera, a photosensitive surface corresponding to a film plane is arranged on the image plane I.

FIGS. 2A, 4A, 6A, 8A, 10A, 12A, and 14A are aberration diagrams of the zoom lenses according to the first to seventh exemplary embodiments at the wide-angle ends in focusing on an object at infinity. FIGS. 2B, 4B, 6B, 8B, 10B, 12B, and 14B are aberration diagrams of the zoom lenses according to the first to seventh exemplary embodiments at the telephoto ends in focusing on an object at infinity.

In each spherical aberration diagram, a solid line and a two-dot chain line indicate spherical aberrations at the d-line (wavelength 587.6 nm) and the g-line (wavelength 435.8 nm), respectively. In each astigmatism diagram, a dashed line and a solid line indicate astigmatisms in meridional and sagittal image planes, respectively. In each distortion aberration diagram, a distortion aberration at the d-line is indicated. In each chromatic aberration diagram, a solid line and a two-dot chain line indicate magnification chromatic aberrations at the d- and g-lines, respectively. Fno indicates an F-number, and ω indicates a half angle of view (°). The full scale of the horizontal axis in each spherical aberration diagram is ±0.200 mm, and the full scale of the horizontal axis in each astigmatism diagram is also ±0.200 mm. The full scale of the horizontal axis in each distortion aberration diagram is ±10.000%. The full scale of the horizontal axis in each chromatic aberration diagram is ±0.050 mm. Further, ω indicates an imaging half-angle of view (°).

Next, distinctive configurations of the zoom lenses according to the exemplary embodiments will be described below. According to each exemplary embodiment, the subgroup GRN consists of two or fewer negative lenses and two or fewer positive lenses. This configuration leads to the achievement of a zoom lens having high optical performance while being small in size and weight. Further, a positive lens is arranged closest to the object side in the subgroup GRN.

Further, the zoom lenses according to the exemplary embodiments are configured to satisfy the following conditional inequalities:

$$0.0 < \nu dGRNn - \nu dGRNp < 50.0;\text{ and} \quad (1)$$

$$0.1 < \beta GR < 0.7. \quad (2)$$

In the conditional inequalities, νdGRNn is an average value of an Abbe number with reference to the d-line of a material of the negative lenses in the subgroup GRN, νdGRNp is an average value of an Abbe number with reference to the d-line of a material of the positive lenses in the subgroup GRN, and βGR is a lateral magnification of the lens group GR. The Abbe number νd with reference to the d-line is defined as νd=(Nd−1)/(NF−NC), where NF is a refractive index at the F-line (wavelength 486.1 nm), Nd is a refractive index at the d-line (wavelength 587.6 nm), and NC is a refractive index at the C-line (wavelength 656.3 nm).

Conditional inequality (1) defines a relationship between the average value νdGRNn of the Abbe number with reference to the d-line of the material of the negative lenses in the subgroup GRN and the average value νdGRNp of the Abbe number with reference to the d-line of the material of the positive lenses in the subgroup GRN. Exceeding the upper limit value of conditional inequality (1) is undesirable because this may lead to overcorrection of axial chromatic aberrations. Falling below the lower limit value of conditional inequality (1) is undesirable because it becomes difficult to effectively correct axial chromatic aberrations caused by the negative lenses in the subgroup GRN.

Conditional inequality (2) defines the lateral magnification βGR of the lens group GR. In a case where the upper limit value of conditional inequality (2) is exceeded, the lateral magnification βGR of the lens group GR becomes excessively high, and the light beam is excessively converged by the lens group GR. This may lead to an occurrence of significant axial chromatic aberrations, so that exceeding the upper limit value of conditional inequality (2) is undesirable. Falling below the lower limit value of conditional inequality (2) is undesirable because the lateral magnification βGR of the lens group GR becomes excessively low and this may lead to an increase in size of the zoom lens.

The foregoing configuration leads to the achievement of a zoom lens that is small in size and weight and has a wide angle of view, a high zoom ratio, and high optical performance.

In one embodiment, conditional inequalities (1) and (2) according to each exemplary embodiment are set to the following numerical ranges:

$$1.0 < vdGRNn - vdGRNp < 40.0; \text{ and} \quad (1a)$$

$$0.1 < \beta GR < 0.6. \quad (2a)$$

In another embodiment, conditional inequalities (1) and (2) are set to the following numerical ranges:

$$1.5 < vdGRNn - vdGRNp < 30.0; \text{ and} \quad (1b)$$

$$0.1 < \beta GR < 0.5. \quad (2b)$$

In another yet embodiment, conditional inequalities (1) and (2) are set to the following numerical ranges:

$$2.0 < vdGRNn - vdGRNp < 27.0; \text{ and} \quad (1c)$$

$$0.2 < \beta GR < 0.5. \quad (2c)$$

Furthermore, each of the zoom lenses according to the exemplary embodiments satisfies one or more of the following conditional inequalities:

$$1.6 < dIE / fw < 15.0; \quad (3)$$

$$-0.1 < 1/(fGRN / fw) < 0.0; \quad (4)$$

$$-1.0 < 1/\beta GRN < 1.0; \quad (5)$$

$$0.0 < vdGRPn - vdGRPp, 50.0; \text{ and} \quad (6)$$

$$-0.05 < \beta fn < 0.05. \quad (7)$$

In the conditional inequalities, fw is a focal length of the zoom lens at the wide-angle end, dIE is the longest air gap on the optical axis in the lens group GR, fGRN is a focal length of the subgroup GRN, and βGRN is a lateral magnification of the subgroup GRN. Further, νdGRPn is an average value of an Abbe number with reference to the d-line of a material of the negative lenses in the subgroup GRP, and νdGRPp is an average value of an Abbe number with reference to the d-line of a material of the positive lenses in the subgroup GRP. Further, βfn is a composite lateral magnification from the first lens group L1 to the subgroup GRN at the wide-angle end.

Technical meanings of the conditional inequalities will be described below. Conditional inequality (3) defines the ratio between the focal length fw of the zoom lens at the wide-angle end and the longest air gap dIE on the optical axis in the lens group GR. Exceeding the upper limit value of conditional inequality (3) is undesirable because the lens group GR increases in size and this leads to an increase in size of the entire zoom lens system. Falling below the lower limit value of conditional inequality (3) is undesirable because it becomes difficult to effectively correct axial chromatic aberrations.

Conditional inequality (4) defines the ratio between the focal length fw of the zoom lens at the wide-angle end and the focal length fGRN of the subgroup GRN. Deviating from the numerical range of conditional inequality (4) is undesirable because the refractive power of the subgroup GRN falls outside an acceptable range and it becomes difficult to effectively correct various aberrations.

Conditional inequality (5) defines the lateral magnification βGRN of the subgroup GRN. Deviating from the numerical range of conditional inequality (5) leads to a difficulty in changing the light beam incident on the subgroup GRN close to parallel light. This may result in a significant change in optical performance in, for example, inserting an optical system between the subgroup GRN and the subgroup GRP or removing the optical system, so that deviating from the numerical range of conditional inequality (5) is undesirable.

Conditional inequality (6) defines the relationship between the average value νdGRPn of the Abbe number with reference to the d-line of the material of the negative lenses in the subgroup GRP and the average value νdGRPp of the Abbe number with reference to the d-line of the material of the positive lenses in the subgroup GRP. Deviating from the numerical range of conditional inequality (6) is undesirable because it becomes difficult to effectively correct magnification chromatic aberrations.

Conditional inequality (7) defines the composite lateral magnification βfn from the first lens group L1 to the subgroup GRN at the wide-angle end. In a case where the upper limit value of conditional inequality (7) is exceeded, the light beam emitted from the subgroup GRN is excessively converged. This may result in a significant change in optical performance in, for example, inserting an optical system between the subgroup GRN and the subgroup GRP or removing the optical system, so that exceeding the upper limit value of conditional inequality (7) is undesirable.

Falling below the lower limit value of conditional inequality (7) leads to excessive divergence of the light beam emitted from the subgroup GRN. This may result in an increase in size of the subgroup GRP, so that falling below the lower limit value of conditional inequality (7) is undesirable.

In one embodiment, conditional inequalities (3) to (7) according to the exemplary embodiments are set to the following numerical ranges:

$$1.6 < dIE / fw < 13.0; \quad (3a)$$

$$-0.09 < 1/(fGRN / fw) < 0.0; \quad (4a)$$

$$-0.5 < 1/\beta GRN < 0.99; \quad (5a)$$

$$5.0 < vdGRPn - vdGRPp < 45.0; \text{ and} \quad (6a)$$

$$-0.04 < \beta fn < 0.04. \quad (7a)$$

In another embodiment, conditional inequalities (3) to (7) are set to the following numerical ranges:

$$1.6 < dIE / fw < 11.0; \quad (3b)$$

$$-0.08 < 1/(fGRN / fw) < -0.001; \quad (4b)$$

$$-0.1 < 1/\beta GRN < 0.99; \quad (5b)$$

$$10.0 < vdGRPn - vdGRPp < 40.0; \text{ and} \quad (6b)$$

$$-0.03 < \beta fn < 0.03. \quad (7b)$$

In another yet embodiment, conditional inequalities (3) to (7) are set to the following numerical ranges:

$$1.6 < dIE/fw < 9.0; \quad (3c)$$

$$-0.07 < 1/(fGRN/fw) < -0.001; \quad (4c)$$

$$-0.05 < 1/\beta GRN < 0.99; \quad (5c)$$

$$15.0 < vdGRPn - vdGRPp < 35.0; \text{ and} \quad (6c)$$

$$-0.02 < \beta fn < 0.02. \quad (7c)$$

Next, detailed configurations of the zoom lenses according to the exemplary embodiments will be described below.

The zoom lens according to the first exemplary embodiment consists of the first lens group L1 having a positive refractive power, a second lens group L2 having a negative refractive power, a third lens group L3 having a negative refractive power, a fourth lens group L4 having a positive refractive power, and a fifth lens group L5 having a positive refractive power, arranged in this order from the object side to the image side. The fourth lens group L4 corresponds to the lens group GP, and the fifth lens group L5 corresponds to the lens group GR. In zooming from the wide-angle end to the telephoto end, the first lens group L1 and the fifth lens group L5 do not move whereas the second lens group L2 moves monotonously from the object side to the image side and the third lens group L3 and the fourth lens group L4 move. The aperture stop SP is arranged between the fourth lens group L4 and the fifth lens group L5.

The zoom lens according to the second exemplary embodiment consists of the first lens group L1 having a positive refractive power, the second lens group L2 having a negative refractive power, the third lens group L3 having a negative refractive power, and the fourth lens group L4 having a negative refractive power, arranged in this order from the object side to the image side. Furthermore, the fifth lens group L5 (the lens group GP) having a positive refractive power and a sixth lens group L6 (the lens group GR) having a positive refractive power are arranged on the image side of the fourth lens group L4. In zooming from the wide-angle end to the telephoto end, the first lens group L1 and the sixth lens group L6 do not to move whereas the second lens group L2 and the third lens group L3 move monotonously from the object side to the image side and the fourth lens group L4 and the fifth lens group L5 move. The aperture stop SP is arranged between the fifth lens group L5 and the sixth lens group L6.

Configurations of the zoom lenses according to the third, fourth, fifth, sixth, and seventh exemplary embodiments are similar to the configuration of the zoom lens according to the first exemplary embodiment.

First to seventh numerical examples corresponding to the first to seventh exemplary embodiments will be described below.

In surface data on the numerical examples, r is a radius of curvature of each optical surface, and d (mm) is an on-axis interval (distance on the optical axis) between the m-th and (m+1)th surfaces, where m is a surface number counted from a light incident side. Further, nd is a refractive index with respect to the d-line of an optical member, and νd is an Abbe number of the optical member. The Abbe number νd of a material is expressed by:

$$\nu d = (Nd - 1)/(NF - NC),$$

where Nd, NF, and NC are refractive indices at the Fraunhofer d-line (587.6 nm), F-line (486.1 nm), C-line (656.3 nm), and g-line (wavelength 435.8 nm).

Focal lengths (mm), F-numbers, and half angles of view (°) are values in a state where the zoom lens is focused on an object at infinity. A total lens length is a length obtained by adding a back focus BF to a distance from a lens surface closest to the object side to the last surface (lens surface closest to the image side) of the zoom lens on the optical axis. The back focus BF is an air equivalent length of the distance from the last surface of the zoom lens to the image plane on the optical axis.

An asterisk (*) is added to the right of each surface number of an optical surface that is aspherical. An aspherical shape is expressed by the following formula:

$$x = (h^2/R)/\left[1 + \left\{1(1+k)(h/R)^2\right\}^{1/2}\right] + A3 \times h^3 + A4 \times h^4 + A5 \times h^5 + A6 \times h^6 + A7 \times h^7 + A8 \times h^8 + A9 \times h^9 + A10 \times h^{10} + A11 \times h^{11} + A12 \times h^{12} + A13 \times h^{13} + A14 \times h^{14} + A15 \times h^{15} + A16 \times h^{16},$$

where x is an amount of displacement from a surface vertex in an optical axis direction, h is a height from the optical axis in a direction perpendicular to the optical axis, R is a paraxial radius of curvature, and k is a conic constant. Further, A3, A4, A5, A6, A7, A8, A9, A10, A11, A12, A13, A14, A15, and A16 are aspherical coefficients for each order. In the aspherical coefficients, "e±XX" indicates "$\times 10^{\pm XX}$".

First Numerical Example unit: mm

| Surface Data | | | | |
|---|---|---|---|---|
| Surface Number | r | d | nd | νd |
| 1 | −149.059 | 1.50 | 1.76634 | 35.8 |
| 2 | 133.529 | 5.10 | | |
| 3 | 181.054 | 11.74 | 1.43387 | 95.1 |
| 4 | −127.668 | 0.20 | | |
| 5 | 257.936 | 7.03 | 1.43387 | 95.1 |
| 6 | −257.936 | 7.09 | | |
| 7 | 165.831 | 5.74 | 1.43387 | 95.1 |
| 8 | 1350.737 | 0.15 | | |
| 9 | 126.151 | 11.11 | 1.43387 | 95.1 |
| 10 | −221.313 | 0.49 | | |
| 11 | 63.698 | 5.87 | 1.76385 | 48.5 |
| 12 | 108.416 | (variable) | | |
| 13* | 107.013 | 0.85 | 2.05090 | 26.9 |
| 14 | 12.679 | 5.36 | | |
| 15 | −30.111 | 0.60 | 1.88300 | 40.8 |
| 16 | −401.121 | 6.78 | 1.89286 | 20.4 |
| 17 | −10.830 | 0.65 | 2.00100 | 29.1 |
| 18 | −126.500 | 0.18 | | |
| 19 | 53.124 | 2.75 | 1.78472 | 25.7 |
| 20 | −139.718 | (variable) | | |
| 21 | −36.661 | 0.90 | 1.95375 | 32.3 |
| 22 | 125.708 | 3.28 | 1.92286 | 18.9 |
| 23 | −79.329 | (variable) | | |
| 24 | 270.503 | 6.86 | 1.77250 | 49.6 |
| 25* | −47.332 | 0.15 | | |
| 26 | 43.458 | 1.10 | 1.89286 | 20.4 |
| 27 | 25.980 | 7.23 | 1.64000 | 60.1 |
| 28 | 201.186 | (variable) | | |
| 29 (aperture) | ∞ | 2.48 | | |
| 30 | −131.227 | 3.40 | 1.84666 | 23.8 |
| 31 | −38.975 | 0.90 | 1.81600 | 46.6 |

| Surface Data | | | | |
|---|---|---|---|---|
| Surface Number | r | d | nd | νd |
| 32 | 519.453 | 35.00 | | |
| 33 | 45.791 | 4.93 | 1.75520 | 27.5 |
| 34 | −176.937 | 2.78 | | |
| 35 | 367.396 | 0.90 | 2.00100 | 29.1 |
| 36 | 22.124 | 6.97 | 1.49700 | 81.5 |
| 37 | −88.326 | 0.20 | | |
| 38 | 357.352 | 4.77 | 1.48749 | 70.2 |
| 39 | −28.360 | 0.90 | 1.88300 | 40.8 |
| 40 | −204.507 | 0.15 | | |
| 41 | 43.617 | 6.23 | 1.48749 | 70.2 |
| 42 | −42.794 | 4.00 | | |
| 43 | ∞ | 33.00 | 1.60859 | 46.4 |
| 44 | ∞ | 13.20 | 1.51633 | 64.1 |
| 45 | ∞ | 6.99 | | |
| Image Plane | ∞ | | | |

Aspherical Data

Thirteenth Surface

K=1.99983e+00 A4=1.77649e-05 A6=−5.29341e-08 A8=3.29999e-10 A10=1.02584e-11 A12=−2.22171e-13 A14=1.50679e-15 A16=−3.44562e-18

Twenty-Fifth Surface

K=−1.91921e-01 A4=8.11367e-07 A6=7.19921e-09 A8=−1.46342e-10 A10=1.41032e-12 A12=−6.88616e-15 A14=1.65877e-17 A16=−1.56715e-20

Various Data

| Zoom Ratio 25.91 | | | |
|---|---|---|---|
| | Wide | Middle | Telephoto |
| Focal Lengths | 7.58 | 29.35 | 196.36 |
| F-number | 1.80 | 1.80 | 2.95 |
| Angles of View | 35.97 | 10.61 | 1.60 |
| Image Height | 5.50 | 5.50 | 5.50 |
| Total Lens Length | 276.27 | 276.27 | 276.27 |
| BF | 40.21 | 40.21 | 40.21 |
| d12 | 0.70 | 37.21 | 58.25 |
| d20 | 68.05 | 12.89 | 3.40 |
| d23 | 1.81 | 14.62 | 1.10 |
| d28 | 3.17 | 9.01 | 10.98 |

| Zoom Lens Group Data | | |
|---|---|---|
| Group | Start Surface | Focal Length |
| 1 | 1 | 72.15 |
| 2 | 13 | −12.90 |
| 3 | 21 | −71.58 |
| 4 | 24 | 36.72 |
| 5 | 30 | 52.74 |

Second Numerical Example

Unit: mm

| Surface Data | | | | |
|---|---|---|---|---|
| Surface Number | r | d | nd | νd |
| 1 | −138.234 | 1.50 | 1.76634 | 35.8 |
| 2 | 170.307 | 3.00 | | |
| 3 | 338.059 | 9.37 | 1.43387 | 95.1 |
| 4 | −127.590 | 0.20 | | |
| 5 | 313.524 | 6.64 | 1.43387 | 95.1 |
| 6 | −192.054 | 7.10 | | |
| 7 | 122.116 | 6.38 | 1.43387 | 95.1 |
| 8 | −25872.299 | 0.23 | | |
| 9 | 106.314 | 8.65 | 1.43387 | 95.1 |
| 10 | −326.747 | 0.26 | | |
| 11 | 61.273 | 4.94 | 1.76385 | 48.5 |
| 12 | 95.552 | (variable) | | |
| 13* | 56.137 | 0.40 | 2.05090 | 26.9 |
| 14 | 12.635 | (variable) | | |
| 15 | −24.849 | 0.40 | 2.00100 | 29.1 |
| 16 | 38.456 | 8.26 | 1.89286 | 20.4 |
| 17 | −10.415 | 0.40 | 2.00100 | 29.1 |
| 18 | −76.934 | 0.18 | | |
| 19 | 71.811 | 2.56 | 1.76182 | 26.5 |
| 20 | −126.719 | (variable) | | |
| 21 | −172.115 | 0.50 | 1.88300 | 40.8 |
| 22 | 44.952 | 4.10 | 1.84666 | 23.8 |
| 23 | −160.478 | 2.86 | | |
| 24 | −34.526 | 0.50 | 1.88300 | 40.8 |
| 25 | −83.742 | (variable) | | |
| 26* | 209.117 | 6.13 | 1.72916 | 54.7 |
| 27 | −40.907 | 0.20 | | |
| 28 | 86.596 | 6.42 | 1.64000 | 60.1 |
| 29 | −57.682 | 1.00 | 1.95906 | 17.5 |
| 30 | −147.085 | (variable) | | |
| 31 (aperture) | ∞ | 0.20 | | |
| 32 | 45.903 | 2.96 | 1.84666 | 23.8 |
| 33 | 114.086 | 0.70 | 1.95375 | 32.3 |
| 34 | 34.504 | 40.00 | | |
| 35 | 65.751 | 4.75 | 1.80518 | 25.4 |
| 36 | −92.295 | 1.24 | | |
| 37 | 1946.788 | 0.70 | 1.88300 | 40.8 |
| 38 | 29.220 | 6.59 | 1.48749 | 70.2 |
| 39 | −83.842 | 0.35 | | |
| 40 | 56.794 | 7.65 | 1.43875 | 94.7 |
| 41 | −28.104 | 0.70 | 2.00100 | 29.1 |
| 42 | −409.463 | 1.35 | | |
| 43 | −989.440 | 4.70 | 1.49700 | 81.5 |
| 44 | −30.294 | 4.00 | | |
| 45 | ∞ | 33.00 | 1.60859 | 46.4 |
| 46 | ∞ | 13.20 | 1.51633 | 64.1 |
| 47 | ∞ | 7.41 | | |
| Image Plane | ∞ | | | |

Aspherical Data

Thirteenth Surface

K=1.42691e+00 A4=1.26196e-05 A6=3.32720e-08 A8=−2.61470e-09 A10=6.34657e-11 A12=−7.73970e-13 A14=4.64465e-15 A16=−1.08712e-17

Twenty-Sixth Surface

K=−2.40244e-03 A4=−2.90672e-06 A6=2.01624e-09 A8=−4.49726e-12 A10=1.00462e-14 A12=−8.67681e-18

Various Data

| Zoom Ratio 27.23 | | | |
|---|---|---|---|
| | Wide | Middle | Telephoto |
| Focal Lengths | 7.49 | 30.11 | 203.99 |
| F-number | 1.80 | 1.80 | 3.30 |
| Angles of View | 36.29 | 10.35 | 1.54 |
| Image Height | 5.50 | 5.50 | 5.50 |
| Total Lens Length | 272.94 | 272.94 | 272.94 |
| BF | 40.63 | 40.63 | 40.63 |
| d12 | 0.61 | 35.69 | 55.91 |
| d14 | 7.24 | 6.27 | 6.88 |
| d20 | 67.13 | 13.73 | 5.63 |
| d25 | 0.37 | 10.67 | 0.69 |
| d30 | 2.91 | 11.90 | 9.15 |

| Zoom Lens Group Data | | |
|---|---|---|
| Group | Start Surface | Focal Length |
| 1 | 1 | 70.95 |
| 2 | 13 | −15.59 |
| 3 | 15 | −50.78 |
| 4 | 21 | −63.34 |
| 5 | 26 | 34.31 |
| 6 | 32 | 57.67 |

Third Numerical Example

Unit: mm

| Surface Data | | | | |
|---|---|---|---|---|
| Surface Number | r | d | nd | νd |
| 1 | −166.391 | 2.80 | 1.74951 | 35.3 |
| 2 | 149.078 | 1.54 | | |
| 3 | 151.637 | 5.42 | 1.95906 | 17.5 |
| 4 | 321.568 | 3.86 | | |
| 5 | 642.689 | 11.47 | 1.60311 | 60.6 |
| 6* | −136.804 | 8.78 | | |
| 7 | 152.251 | 2.50 | 1.84666 | 23.8 |
| 8 | 80.700 | 10.08 | 1.43875 | 94.7 |
| 9 | 513.453 | 6.13 | | |
| 10 | 124.656 | 10.50 | 1.43387 | 95.1 |
| 11 | −271.138 | 0.20 | | |
| 12 | 68.071 | 9.74 | 1.59522 | 67.7 |
| 13 | 343.602 | (variable) | | |
| 14 | 159.046 | 0.95 | 1.75500 | 52.3 |
| 15 | 17.677 | 7.57 | | |
| 16 | −31.690 | 0.75 | 1.49700 | 81.5 |
| 17 | 73.636 | 5.82 | 1.80000 | 29.8 |
| 18 | −25.391 | 0.93 | | |
| 19 | −21.647 | 1.20 | 1.76385 | 48.5 |
| 20* | −264.193 | (variable) | | |
| 21 | −68.095 | 4.14 | 1.80810 | 22.8 |
| 22 | −32.517 | 1.10 | 1.90525 | 35.0 |
| 23 | −141.980 | (variable) | | |
| 24* | 58.534 | 8.71 | 1.77250 | 49.6 |
| 25 | −74.409 | 0.20 | | |
| 26 | 144.197 | 1.10 | 1.85478 | 24.8 |
| 27 | 37.922 | 6.70 | 1.49700 | 81.5 |
| 28 | −386.229 | (variable) | | |
| 29 (aperture) | ∞ | 2.00 | | |
| 30 | 173.968 | 6.15 | 1.76182 | 26.5 |
| 31 | −59.546 | 0.90 | 2.00100 | 29.1 |
| 32 | 266.573 | 1.45 | | |
| 33 | 251.609 | 2.39 | 1.76182 | 26.5 |

-continued

| Surface Data | | | | |
|---|---|---|---|---|
| Surface Number | r | d | nd | νd |
| 34 | −4630.633 | 43.16 | | |
| 35 | 84.841 | 7.35 | 1.49700 | 81.5 |
| 36 | −49.395 | 5.13 | | |
| 37 | −180.037 | 7.28 | 1.84666 | 23.8 |
| 38 | −27.531 | 0.90 | 2.00100 | 29.1 |
| 39 | −521.544 | 0.20 | | |
| 40 | 52.173 | 9.23 | 1.63980 | 34.5 |
| 41 | −33.148 | 1.00 | 1.95375 | 32.3 |
| 42 | 38.160 | 0.87 | | |
| 43 | 33.646 | 8.50 | 1.51742 | 52.4 |
| 44 | −99.045 | 43.71 | | |
| Image Plane | ∞ | | | |

Aspherical Data

Sixth Surface

K=−1.44366e+01 A4=−6.38487e-07 A 6=2.23141e-10 A8=−8.29959e-14 A10=2.34467e-17 A12=−3.26387e-21

Twentieth Surface

K=5.65086e+01 A4=−9.68290e-06 A6=−4.72454e-09 A8=−2.50862e-11 A10=6.72799e-14 A12=−2.24784e-16

Twenty-Fourth Surface

K=−1.26445e+00 A4=−2.06118e-06 A6=6.46308e-10 A8=7.85246e-13 A10=−4.37839e-15 A12=5.11375e-18

Various Data

| Zoom Ratio 9.52 | | | |
|---|---|---|---|
| | Wide | Middle | Telephoto |
| Focal Lengths | 26.00 | 76.85 | 247.51 |
| F-number | 2.73 | 2.73 | 3.63 |
| Angles of View | 29.65 | 10.90 | 3.42 |
| Image Height | 14.80 | 14.80 | 14.80 |
| Total Lens Length | 313.28 | 313.28 | 313.28 |
| BF | 43.71 | 43.71 | 43.71 |
| d13 | 0.92 | 33.91 | 51.67 |
| d20 | 54.06 | 5.12 | 2.14 |
| d23 | 1.00 | 17.97 | 1.24 |
| d28 | 4.89 | 3.86 | 5.82 |

| Zoom Lens Group Data | | |
|---|---|---|
| Group | Start Surface | Focal Length |
| 1 | 1 | 80.54 |
| 2 | 14 | −18.53 |
| 3 | 21 | −120.02 |
| 4 | 24 | 47.93 |
| 5 | 30 | 121.04 |

Fourth Numerical Example

Unit: mm

Surface Data

| Surface Number | r | d | nd | νd |
|---|---|---|---|---|
| 1* | 1164.523 | 2.50 | 1.83481 | 42.7 |
| 2 | 31.806 | 16.24 | | |
| 3* | 116.859 | 2.00 | 1.83481 | 42.7 |
| 4 | 73.633 | 11.47 | | |
| 5 | −91.374 | 1.80 | 1.83481 | 42.7 |
| 6 | −390.193 | 0.15 | | |
| 7 | 90.685 | 4.30 | 1.92286 | 18.9 |
| 8 | 254.377 | 2.27 | | |
| 9 | 188.429 | 9.30 | 1.60300 | 65.4 |
| 10* | −84.461 | 4.41 | | |
| 11 | 683.245 | 8.40 | 1.43387 | 95.1 |
| 12 | −59.788 | 0.60 | | |
| 13 | −54.986 | 1.70 | 1.80000 | 29.8 |
| 14 | −126.219 | 0.18 | | |
| 15 | 167.309 | 1.70 | 1.91650 | 31.6 |
| 16 | 52.053 | 13.75 | 1.43875 | 94.7 |
| 17 | −108.061 | 0.40 | | |
| 18 | 803.874 | 8.36 | 1.43387 | 95.1 |
| 19 | −70.981 | 0.40 | | |
| 20 | 85.474 | 8.45 | 1.76385 | 48.5 |
| 21 | −205.953 | (variable) | | |
| 22 | 55.970 | 0.70 | 2.00100 | 29.1 |
| 23 | 13.891 | 4.70 | | |
| 24 | −37.737 | 0.70 | 1.88300 | 40.8 |
| 25 | 45.092 | 0.00 | | |
| 26 | 45.092 | 6.32 | 1.85478 | 24.8 |
| 27 | −14.907 | 0.70 | 1.85150 | 40.8 |
| 28 | 93.123 | 0.71 | | |
| 29 | 34.631 | 3.27 | 1.64769 | 33.8 |
| 30 | −130.870 | (variable) | | |
| 31 | −32.995 | 0.80 | 1.72916 | 54.7 |
| 32 | 62.730 | 2.37 | 1.84666 | 23.8 |
| 33 | −557.636 | (variable) | | |
| 34* | 95.606 | 6.09 | 1.58913 | 61.1 |
| 35 | −48.189 | 0.20 | | |
| 36 | 112.959 | 6.19 | 1.48749 | 70.2 |
| 37 | −36.699 | 1.00 | 1.80100 | 35.0 |
| 38 | −53.579 | (variable) | | |
| 39 (aperture) | ∞ | 3.06 | | |
| 40 | −96.913 | 3.84 | 1.84666 | 23.8 |
| 41 | −46.420 | 1.00 | 1.83481 | 42.7 |
| 42 | −2097.238 | 35.50 | | |
| 43 | 95.809 | 4.96 | 1.63980 | 34.5 |
| 44 | −46.690 | 0.77 | | |
| 45 | −182.106 | 0.90 | 1.88300 | 40.8 |
| 46 | 30.015 | 5.03 | 1.48749 | 70.2 |
| 47 | −128.853 | 0.20 | | |
| 48 | 59.263 | 7.70 | 1.43875 | 94.7 |
| 49 | −21.626 | 0.90 | 2.00100 | 29.1 |
| 50 | −69.038 | 0.14 | | |
| 51 | 132.223 | 5.45 | 1.48749 | 70.2 |
| 52 | −31.625 | 4.00 | | |
| 53 | ∞ | 33.00 | 1.60859 | 46.4 |
| 54 | ∞ | 13.20 | 1.51680 | 64.2 |
| 55 | ∞ | 7.45 | | |
| Image Plane | ∞ | | | |

Aspherical Data

First Surface

K=0.00000e+00 A4=5.03102e-06 A6=4.83452e-08 A8=1.59416e-10 A10=−7.63677e-15 A12=1.64471e-16 A14=−2.52910e-20 A16=−9.39669e-24 A3=−1.19621e-06 A5=−3.82397e-07 A7=−3.83715e-09 A9=−2.47278e-12 A11=−2.19296e-15 A13=−2.81837e-18 A15=1.19260e-21

Third Surface

K=0.00000e+00 A4=−3.91833e-06 A6=−1.36930e-07 A8=−8.58604e-10 A10=6.54807e-13 A12=2.38917e-

15 A14=−1.00159e-18 A16=−3.03481e-22 A3=2.79304e-06 A5=7.94989e-07 A7=1.44093e-08 A9=2.12004e-11 A11=−7.19102e-14 A13=−2.04972e-17 A15=3.25713e-20

Tenth Surface

K=0.00000e+00 A4=9.86087e-07 A6=1.91585e-10 A8=−9.03646e-13 A10=9.05947e-16 A12=−1.75246e-18 A14=2.11271e-21 A16=−9.30590e-25

Thirty-Fourth Surface

K=−3.11230e+01 A4=−2.74594e-08 A6=−3.90615e-09 A8=2.89026e-12

Various Data

Zoom Ratio 13.61

| | Wide | Middle | Telephoto |
|---|---|---|---|
| Focal Lengths | 4.43 | 15.50 | 60.24 |
| F-number | 1.86 | 1.86 | 2.77 |
| Angles of View | 51.16 | 19.54 | 5.21 |
| Image Height | 5.50 | 5.50 | 5.50 |
| Total Lens Length | 298.66 | 298.66 | 298.66 |
| BF | 40.66 | 40.66 | 40.66 |
| d21 | 0.65 | 30.27 | 43.40 |
| d30 | 40.91 | 7.47 | 2.95 |
| d33 | 13.10 | 17.10 | 2.09 |
| d38 | 1.77 | 1.60 | 8.00 |

Zoom Lens Group Data

| Group | Start Surface | Focal Length |
|---|---|---|
| 1 | 1 | 26.47 |
| 2 | 22 | −17.26 |
| 3 | 31 | −53.67 |
| 4 | 34 | 35.95 |
| 5 | 40 | 50.60 |

Fifth Numerical Example

Unit: mm

Surface Data

| Surface Number | r | d | nd | νd |
|---|---|---|---|---|
| 1 | 202.323 | 3.00 | 1.75500 | 52.3 |
| 2 | 142.859 | 3.45 | | |
| 3 | 166.010 | 14.07 | 1.43387 | 95.1 |
| 4 | −536.333 | 0.47 | | |
| 5 | −2160.193 | 3.00 | 1.75500 | 52.3 |
| 6 | 147.354 | 1.27 | | |
| 7 | 141.652 | 13.07 | 1.43387 | 95.1 |
| 8 | −5023.156 | 12.85 | | |
| 9 | 177.654 | 9.27 | 1.43387 | 95.1 |
| 10 | 1497.524 | 0.20 | | |
| 11 | 160.006 | 11.72 | 1.43387 | 95.1 |
| 12 | −1832.268 | 0.50 | | |
| 13 | 112.106 | 7.50 | 1.43387 | 95.1 |
| 14 | 182.774 | (variable) | | |
| 15 | 253.534 | 1.40 | 1.69930 | 51.1 |
| 16 | 31.656 | 2.42 | | |
| 17 | 47.123 | 10.62 | 1.61310 | 44.4 |
| 18 | −32.822 | 1.30 | 1.59522 | 67.7 |
| 19 | 25.133 | 4.36 | | |
| 20 | 63.199 | 1.30 | 1.63858 | 55.2 |
| 21 | 33.589 | 5.97 | 1.67300 | 38.3 |

-continued

| Surface Data | | | | |
|---|---|---|---|---|
| Surface Number | r | d | nd | νd |
| 22 | −81.115 | 2.62 | | |
| 23 | −30.696 | 1.20 | 1.59522 | 67.7 |
| 24* | 110.844 | (variable) | | |
| 25 | 375.463 | 1.00 | 1.69930 | 51.1 |
| 26 | 21.833 | 3.95 | 1.74951 | 35.3 |
| 27 | 111.123 | 2.67 | | |
| 28 | −40.643 | 1.00 | 1.59522 | 67.7 |
| 29 | 270.808 | (variable) | | |
| 30* | 62.470 | 5.68 | 1.59522 | 67.7 |
| 31 | −128.831 | 0.20 | | |
| 32 | 66.597 | 7.34 | 1.43875 | 94.9 |
| 33 | −34.439 | 1.30 | 1.64000 | 60.1 |
| 34 | −126.161 | (variable) | | |
| 35 (aperture) | ∞ | 0.30 | | |
| 36 | 162.463 | 3.46 | 1.48749 | 70.2 |
| 37 | −128.728 | 0.16 | | |
| 38 | 47.733 | 1.50 | 1.49700 | 81.5 |
| 39 | 25.156 | 33.95 | | |
| 40 | 21.424 | 7.62 | 1.43875 | 94.9 |
| 41 | −58.819 | 0.20 | | |
| 42 | 41.577 | 6.46 | 1.43875 | 94.9 |
| 43 | −23.735 | 1.20 | 1.65160 | 58.5 |
| 44 | 16.012 | 2.00 | | |
| 45 | 20.767 | 4.09 | 1.49700 | 81.5 |
| 46 | −38.679 | 1.20 | 2.00100 | 29.1 |
| 47 | 43.170 | 9.14 | | |
| 48 | 62.713 | 4.87 | 1.80518 | 25.4 |
| 49 | −39.952 | 1.20 | 1.85920 | 33.0 |
| 50 | −61.291 | 4.87 | | |
| 51 | ∞ | 33.00 | 1.60859 | 46.4 |
| 52 | ∞ | 13.20 | 1.51680 | 64.2 |
| 53 | ∞ | 7.39 | | |
| Image Plane | ∞ | | | |

Aspherical Data

Twenty-Fourth Surface

K=0.00000e+00 A4=−1.39423e-05 A6=4.66924e-09 A8=8.52883e-11 A10=−3.01113e-13 A12=7.89726e-16

A3=2.82395e-06 A5=−7.46597e-09 A7=−9.43023e-10

Thirtieth Surface

K=−5.07198e+00 A4=1.21006e-06 A6=−1.28223e-09 A8=9.84531e-12 A10=−3.16405e-14 A12=4.05911e-17

Various Data

| Zoom Ratio 39.95 | | | |
|---|---|---|---|
| | Wide | Middle | Telephoto |
| Focal Lengths | 14.00 | 57.12 | 559.31 |
| F-number | 2.81 | 2.80 | 5.09 |
| Angles of View | 21.45 | 5.50 | 0.56 |
| Image Height | 5.50 | 5.50 | 5.50 |
| Total Lens Length | 383.01 | 383.01 | 383.01 |
| BF | 41.48 | 41.48 | 41.48 |
| d14 | 4.00 | 71.87 | 110.63 |
| d24 | 94.47 | 22.21 | 7.37 |
| d29 | 23.45 | 30.04 | 1.93 |
| d34 | 7.54 | 5.34 | 9.52 |

| Zoom Lens Group Data | | |
|---|---|---|
| Group | Start Surface | Focal Length |
| 1 | 1 | 161.75 |
| 2 | 15 | −25.56 |
| 3 | 25 | −51.77 |
| 4 | 30 | 50.98 |
| 5 | 36 | 89.96 |

Sixth Numerical Example

Unit: mm

| Surface Data | | | | |
|---|---|---|---|---|
| Surface Number | r | d | nd | νd |
| 1 | 1161.973 | 3.00 | 1.83481 | 42.7 |
| 2* | 55.708 | 10.48 | | |
| 3 | 202.598 | 2.30 | 1.85478 | 24.8 |
| 4 | 91.753 | 10.37 | 1.43875 | 94.7 |
| 5 | −179.322 | 3.82 | | |
| 6 | 96.636 | 10.91 | 1.43387 | 95.1 |
| 7 | −127.744 | 3.64 | | |
| 8 | 84.532 | 7.63 | 1.43875 | 94.7 |
| 9* | 271.789 | 1.35 | | |
| 10* | 86.189 | 6.25 | 1.76385 | 48.5 |
| 11 | −526.736 | (variable) | | |
| 12* | 452.536 | 0.80 | 1.95375 | 32.3 |
| 13 | 14.288 | 6.02 | | |
| 14 | −34.746 | 0.80 | 1.88300 | 40.8 |
| 15 | −342.558 | 6.64 | 1.89286 | 20.4 |
| 16 | −12.125 | 0.60 | 1.95375 | 32.3 |
| 17 | 1468.209 | 0.18 | | |
| 18 | 48.950 | 3.77 | 1.62000 | 62.2 |
| 19 | −53.156 | (variable) | | |
| 20 | −29.258 | 0.75 | 1.71300 | 53.8 |
| 21 | 68.257 | 2.70 | 1.80810 | 22.8 |
| 22 | −266.726 | (variable) | | |
| 23* | 80.582 | 5.40 | 1.72916 | 54.7 |
| 24 | −54.890 | 0.21 | | |
| 25 | −250.931 | 1.10 | 1.85478 | 24.8 |
| 26 | 40.024 | 7.04 | 1.78336 | 49.5 |
| 27 | −67.274 | (variable) | | |
| 28 (aperture) | ∞ | 2.89 | | |
| 29 | 265.955 | 7.18 | 1.72151 | 29.2 |
| 30 | −36.469 | 0.90 | 1.74100 | 52.6 |
| 31 | 93.872 | 35.00 | | |
| 32 | 57.552 | 6.29 | 1.74840 | 27.7 |
| 33 | −153.418 | 3.49 | | |
| 34 | −1256.618 | 1.00 | 1.88300 | 40.8 |
| 35 | 20.318 | 9.12 | 1.49700 | 81.5 |
| 36 | −54.978 | 0.35 | | |
| 37 | 62.438 | 4.73 | 1.43875 | 94.7 |
| 38 | −32.455 | 1.00 | 2.00100 | 29.1 |
| 39 | 532.156 | 0.21 | | |
| 40 | 44.870 | 5.59 | 1.50137 | 56.4 |
| 41 | −32.096 | 4.00 | | |
| 42 | ∞ | 33.00 | 1.60859 | 46.4 |
| 43 | ∞ | 13.20 | 1.51633 | 64.1 |
| 44 | ∞ | 5.99 | | |
| Image Plane | ∞ | | | |

Aspherical Data

Second Surface

K=0.00000e+00 A4=−3.88538e-07 A6=1.38805e-10 A8=2.55862e-14 A10=9.31507e-18

Ninth Surface

K=0.00000e+00 A4=−1.35128e-06 A6=−4.70579e-10 A8=−3.54412e-12 A10=7.10965e-15 A12=−6.18795e-18 A14=2.73136e-21 A16=−4.92221e-25

Tenth Surface

K=0.00000e+00 A4=−8.86143e-07 A6=−3.48567e-10 A8=−2.07946e-12 A10=3.61558e-15 A12=−2.85289e-18 A14=1.12335e-21 A16=−1.80823e-25

Twelfth Surface

K=−1.04680e-01 A4=1.21567e-05 A6=−4.36047e-08 A8=1.08229e-09 A10=−1.32183e-11 A12=6.48790e-14 A14=−6.88863e-17 A16=−2.29401e-19

Twenty-Third Surface

K=−9.62925e-01 A4=−4.37878e-06 A6=3.49608e-09 A8=−9.13154e-12 A10=2.27920e-14 A12=−1.74182e-17

Various Data

| Zoom Ratio 20.77 | | | |
|---|---|---|---|
| | Wide | Middle | Telephoto |
| Focal Lengths | 6.50 | 25.23 | 135.00 |
| F-number | 1.80 | 1.80 | 3.10 |
| Angles of View | 40.24 | 12.30 | 2.33 |
| Image Height | 5.50 | 5.50 | 5.50 |
| Total Lens Length | 277.98 | 277.98 | 277.97 |
| BF | 39.17 | 39.16 | 39.16 |
| d11 | 0.68 | 35.84 | 56.10 |
| d19 | 58.37 | 8.09 | 3.00 |
| d22 | 6.14 | 13.16 | 0.07 |
| d27 | 0.10 | 8.20 | 6.12 |

| Zoom Lens Group Data | | |
|---|---|---|
| Group | Start Surface | Focal Length |
| 1 | 1 | 57.64 |
| 2 | 12 | −15.86 |
| 3 | 20 | −50.52 |
| 4 | 23 | 36.62 |
| 5 | 29 | 49.58 |

Seventh Numerical Example

Unit: mm

| Surface Data | | | | |
|---|---|---|---|---|
| Surface Number | r | d | nd | νd |
| 1 | −257.691 | 1.50 | 1.76634 | 35.8 |
| 2 | 221.635 | 2.40 | | |
| 3 | 334.070 | 8.57 | 1.43387 | 95.1 |
| 4 | −186.688 | 0.20 | | |
| 5 | 340.417 | 6.51 | 1.43387 | 95.1 |
| 6 | −340.417 | 11.20 | | |
| 7 | 180.401 | 6.35 | 1.43387 | 95.1 |
| 8 | 2101.988 | 0.15 | | |
| 9 | 134.978 | 10.08 | 1.43387 | 95.1 |
| 10 | −464.396 | 0.50 | | |
| 11 | 66.474 | 7.69 | 1.59522 | 67.7 |
| 12 | 130.178 | (variable) | | |
| 13* | 175.260 | 0.85 | 2.05090 | 26.9 |
| 14 | 16.807 | 4.85 | | |
| 15 | −27.316 | 0.60 | 1.88300 | 40.8 |
| 16 | 82.067 | 6.00 | 1.89286 | 20.4 |
| 17 | −13.384 | 0.65 | 2.00100 | 29.1 |
| 18 | −199.205 | 0.18 | | |
| 19 | 79.364 | 2.74 | 1.76182 | 26.5 |
| 20 | −82.334 | (variable) | | |

-continued

| Surface Data | | | | |
|---|---|---|---|---|
| Surface Number | r | d | nd | νd |
| 21 | −51.897 | 0.90 | 1.95375 | 32.3 |
| 22 | 118.334 | 2.81 | 1.92286 | 18.9 |
| 23 | −132.642 | (variable) | | |
| 24 | 79.108 | 5.71 | 1.90525 | 35.0 |
| 25* | −106.071 | 0.15 | | |
| 26 | 66.106 | 1.10 | 1.89286 | 20.4 |
| 27 | 30.199 | 7.32 | 1.59522 | 67.7 |
| 28 | −311.245 | (variable) | | |
| 29 (aperture) | ∞ | 2.97 | | |
| 30 | −84.230 | 2.45 | 1.80518 | 25.4 |
| 31 | −43.498 | 0.90 | 1.77250 | 49.6 |
| 32 | −336.920 | 35.00 | | |
| 33 | 98.516 | 3.93 | 1.84666 | 23.8 |
| 34 | −107.493 | 3.94 | | |
| 35 | 1150.566 | 0.90 | 2.00100 | 29.1 |
| 36 | 27.790 | 4.29 | 1.49700 | 81.5 |
| 37 | 340.779 | 0.20 | | |
| 38 | 61.773 | 6.28 | 1.48749 | 70.2 |
| 39 | −28.037 | 0.90 | 1.88300 | 40.8 |
| 40 | −87.860 | 0.17 | | |
| 41 | 56.631 | 4.81 | 1.48749 | 70.2 |
| 42 | −50.104 | 4.00 | | |
| 43 | ∞ | 33.00 | 1.60859 | 46.4 |
| 44 | ∞ | 13.20 | 1.51633 | 64.1 |
| 45 | ∞ | 9.39 | | |
| Image Plane | ∞ | | | |

Aspherical Data

Thirteenth Surface

K=−2.00502e+00 A4=3.80730e-06 A6=1.20614e-08 A8=−6.29626e-10 A10=1.48952e-11 A12=−1.80263e-13 A14=1.01064e-15 A16=−2.09742e-18

Twenty-Fifth Surface

K=2.00037e+00 A4=1.55499e-06 A6=−2.04172e-10 A8=−4.31101e-13 A10=2.12996e-14 A12=−1.56330e-16 A14=4.56206e-19 A16=−4.80126e-22

Various Data

| Zoom Ratio 25.93 | | | |
|---|---|---|---|
| | Wide | Middle | Telephoto |
| Focal Lengths | 9.61 | 34.51 | 249.07 |
| F-number | 1.80 | 1.80 | 3.09 |
| Angles of View | 29.79 | 9.06 | 1.26 |
| Image Height | 5.50 | 5.50 | 5.50 |
| Total Lens Length | 278.62 | 278.62 | 278.62 |
| BF | 42.61 | 42.61 | 42.61 |
| d12 | 1.02 | 41.16 | 64.29 |
| d20 | 71.37 | 14.25 | 2.56 |
| d23 | 3.24 | 18.97 | 0.78 |
| d28 | 4.64 | 5.89 | 12.66 |

| Zoom Lens Group Data | | |
|---|---|---|
| Group | Start Surface | Focal Length |
| 1 | 1 | 88.17 |
| 2 | 13 | −14.41 |
| 3 | 21 | −87.45 |
| 4 | 24 | 40.02 |
| 5 | 30 | 54.56 |

Table 1 below presents various values according to the exemplary embodiment. "E-XX" represents "$\times 10^{-XX}$".

TABLE 1

| | | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment |
|---|---|---|---|---|---|---|---|---|
| Formula (1) | νdGRNn-νdGRNp | 22.8 | 8.5 | 2.6 | 19 | 11.3 | 23.4 | 24.2 |
| Formula (2) | βGR | 0.40 | 0.38 | 0.35 | 0.46 | 0.33 | 0.28 | 0.39 |
| Formula (3) | dIE/fw | 4.62 | 5.34 | 1.66 | 8.02 | 2.43 | 5.38 | 3.64 |
| Formula (4) | 1/(FGRN/fw) | −0.055 | −0.055 | −0.003 | −0.036 | −0.03 | −0.036 | −0.062 |
| Formula (5) | 1/βGRN | 0.056 | −0.023 | 0.98 | 0.106 | 0.51 | 0.028 | 0.124 |
| Formula (6) | νdGRPn-νdGRPp | 27.4 | 33 | 17.3 | 32.4 | 34 | 30.1 | 26.5 |
| Formula (7) | βfn | −3.4E−28 | 8.64E−28 | −7.6E−29 | −9.2E−29 | −8.4E−29 | −8.2E−28 | −1.90E−28 |

[Imaging Apparatus]

Figure 15:
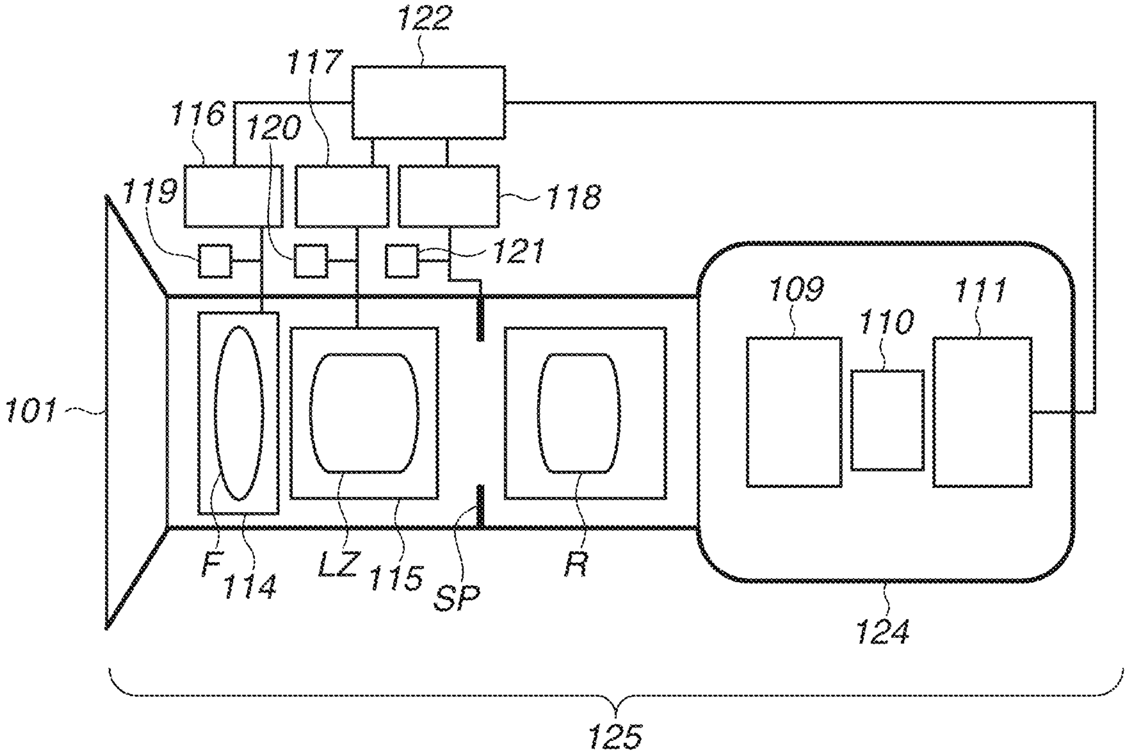
FIG. 15 is a configuration diagram illustrating an imaging apparatus according to the exemplary embodiments.

FIG. 15 illustrates an example of a configuration of an imaging apparatus 125. In FIG. 15, a zoom lens 101 is the zoom lens according to any one of the first to seventh exemplary embodiments. A camera body 124 is a camera body. The zoom lens 101 is attachable to and detachable from the camera body 124. In FIG. 15, the first lens group L1 is indicated as a lens group F, a middle group M as a lens group LZ, and a rear lens group LR as a lens group R. An aperture stop SP is an aperture stop, and drive mechanisms 114 and 115 are mechanisms for driving the lens groups in focusing and zooming, respectively, and include a helicoid and/or a cam. Motors (actuators) 116 to 118 drive the drive mechanisms 114 and 115 and the aperture stop SP. Detection devices 119 to 121 are devices for detecting positions of the lens groups and an aperture diameter of the aperture stop SP and include an encoder, a potentiometer, and/or a photo sensor.

In the camera body 124, a glass block 109 is a glass block indicated as the optical block P according to the first to seventh exemplary embodiments. An image sensor (photoelectric conversion element) 110 is an image sensor, such as a CCD sensor or a CMOS sensor and photoelectrically converts (captures) subject images formed by the zoom lens 101. Further, processing units 111 and 122 are processing units for various types of processing and control in the camera body 124 and the zoom lens 101, respectively, and include a processor, such as a central processing unit (CPU).

By using the zoom lens according to any of the first to seventh exemplary embodiments described above, the imaging apparatus 125 small in size and weight and capable of capturing fine images is provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-110812, filed Jul. 5, 2023, which is hereby incorporated by reference herein in its entirety.

What is claimed is:

1. A zoom lens comprising:

a first lens group arranged closest to an object side, configured not to move for zooming, and having a positive refractive power;

a lens group GR arranged closest to an image side, configured not to move for zooming, and having a positive refractive power; and a lens group GP arranged adjacent to the object side of the lens group GR, configured to move for zooming, an interval between the adjacent lens groups being changed in zooming, and having a positive refractive power, wherein the lens group GR consists of a subgroup GRN having a negative refractive power and a subgroup GRP having a positive refractive power, which are arranged with a longest air gap on an optical axis in the lens group GR, and wherein the following conditional inequalities are satisfied:

$$0.0 < \nu dGRNn - \nu dGRNp < 50.0; \text{ and}$$

$$0.1 < \beta GR < 0.7,$$

where νdGRNn is an average value of an Abbe number with reference to a d-line of a material of a negative lens in the subgroup GRN, νdGRNp is an average value of an Abbe number with reference to a d-line of a material of a positive lens in the subgroup GRN, and βGR is a lateral magnification of the lens group GR.

2. The zoom lens according to claim 1, wherein the following conditional inequality is satisfied:

$$1.6 < dIE/fw < 15.0,$$

where fw is a focal length of the zoom lens at a wide-angle end, and dIE is the longest air gap on the optical axis in the lens group GR.

3. The zoom lens according to claim 1, wherein the following conditional inequality is satisfied:

$$-0.1 < 1/(fGRN/fw) < 0.0,$$

where fw is a focal length of the zoom lens at a wide-angle end, and fGRN is a focal length of the subgroup GRN.

4. The zoom lens according to claim 1, wherein the following conditional inequality is satisfied:

$$-1.0 < 1/\beta GRN < 1.0,$$

where βGRN is a lateral magnification of the subgroup GRN.

5. The zoom lens according to claim 1, wherein the following conditional inequality is satisfied:

$$0.0 < \nu dGRPn - \nu dGRPp < 50.0,$$

where νdGRPn is an average value of an Abbe number with reference to a d-line of a material of a negative lens in the subgroup GRP, and νdGRPp is an average value of an Abbe number with reference to a d-line of a material of a positive lens in the subgroup GRP.

6. The zoom lens according to claim 1, wherein the following conditional inequality is satisfied:

$$-0.05 < \beta fn < 0.05,$$

where βfn is a composite lateral magnification from the first lens group to the subgroup GRN at a wide-angle end.

7. The zoom lens according to claim 1, wherein the subgroup GRN consists of two or fewer negative lenses and two or fewer positive lenses.

8. The zoom lens according to claim 1, wherein a lens arranged closest to the object side in the subgroup GRN is a positive lens.

9. The zoom lens according to claim 1, the zoom lens consisting of the first lens group configured not to move for zooming and having a positive refractive power, a second lens group configured to move for zooming and having a negative refractive power, a third lens group configured to move for zooming and having a negative refractive power, a fourth lens group configured to move for zooming and having a positive refractive power, and a fifth lens group configured not to move for zooming and having a positive refractive power, which are arranged in this order from the object side to the image side.

10. The zoom lens according to claim 1, the zoom lens consisting of the first lens group configured not to move for zooming and having a positive refractive power, a second lens group configured to move for zooming and having a negative refractive power, a third lens group configured to move for zooming and having a negative refractive power, a fourth lens group configured to move for zooming and having a negative refractive power, a fifth lens group configured to move for zooming and having a positive refractive power, and a sixth lens group configured not to move for zooming and having a positive refractive power, which are arranged in this order from the object side to the image side.

11. The zoom lens according to claim 3, wherein the following conditional inequality is satisfied:

$$1.6 < dIE/fw < 15.0,$$

where fw is a focal length of the zoom lens at a wide-angle end, and dIE is the longest air gap on the optical axis in the lens group GR.

12. The zoom lens according to claim 4, wherein the following conditional inequality is satisfied:

$$-0.1 < 1/(fGRN/fw) < 0.0,$$

where fw is a focal length of the zoom lens at a wide-angle end, and fGRN is a focal length of the subgroup GRN.

13. The zoom lens according to claim 4, wherein the following conditional inequalities are satisfied:

$$1.6 < dIE/fw < 15.0; \text{ and}$$

$$-0.1 < 1/(fGRN/fw) < 0.0,$$

where fw is a focal length of the zoom lens at a wide-angle end, dIE is the longest air gap on the optical axis in the lens group GR, and fGRN is a focal length of the subgroup GRN.

14. An imaging apparatus comprising:

the zoom lens according to claim 1; and a sensor configured to perform photoelectric conversion on an image formed by the zoom lens.

* * * * *